United States Patent
Ickinger

(10) Patent No.: US 6,866,171 B2
(45) Date of Patent: Mar. 15, 2005

(54) METHOD FOR INTRODUCING ADDITIVES

(75) Inventor: Georg Michael Ickinger, Graz (AT)

(73) Assignee: Sulzer Chemtech AG, Winterthur (CH)

( * ) Notice: Subject to any disclaimer, the term of this patent is extended or adjusted under 35 U.S.C. 154(b) by 385 days.

(21) Appl. No.: 09/936,039

(22) PCT Filed: Jan. 4, 2001

(86) PCT No.: PCT/AT01/00003
§ 371 (c)(1),
(2), (4) Date: Sep. 8, 2001

(87) PCT Pub. No.: WO01/51267
PCT Pub. Date: Jul. 19, 2001

(65) Prior Publication Data
US 2002/0167103 A1 Nov. 14, 2002

(30) Foreign Application Priority Data

| Jan. 10, 2000 | (AT) | 19/2000 |
| Jun. 7, 2000 | (AT) | 995/2000 |
| Aug. 28, 2000 | (AT) | 1475/2000 |
| Nov. 15, 2000 | (AT) | 1929/2000 |

(51) Int. Cl.[7] .......................................... B22D 41/00
(52) U.S. Cl. ..................................... 222/596; 222/591
(58) Field of Search ............................. 222/566, 591

(56) References Cited

U.S. PATENT DOCUMENTS 3,777,977 A 12/1973 Regneault et al.

(List continued on next page.)

FOREIGN PATENT DOCUMENTS

| AT | PCT/AT01/00003 | 3/2002 |
| DE | 19 48 454 | 4/1971 |
| DE | 38 38 139 A1 | 6/1989 |
| EP | 0 161 614 B1 | 11/1985 |
| EP | 0 310 914 B2 | 4/1989 |
| EP | 0 432 336 B1 | 6/1991 |
| FR | 2 613 639 A1 | 10/1988 |
| GB | 1320057 | 6/1973 |
| JP | 02178012 | 7/1990 |
| WO | PCT WO89/05226 | 6/1989 |
| WO | PCT WO01/66331 A1 | 9/2001 |

OTHER PUBLICATIONS

Fax copy (faxed Nov. 02, 2001) of PCT paper transmitting Search.

Report and translation of PCT paper attached. Mar. 2002.

Primary Examiner—Scott Kastler
(74) Attorney, Agent, or Firm—Francis C. Hand; Carella, Byrne, Bain et al.

(57) ABSTRACT

A method introduces additives into flowing or fluidised media. The spatially predetermined position of the additives in the flowing material, also called fluid bed, is obtained by controlling the pulsating injection, The introduction and exact dosing of additives, that is hardeners, dyes, gas producers and softener for instance, into a liquid plastic stream or metal stream (10) for instance, or the fluid bed of bulk material, such as powder, granules and pellets, is carried out by means of an injector. The invention is used in melting units, in hot channel systems, in tools, componens of tools and injection moulding machines, extruders, injection moulding, pelleting, burner and injection arrangements. The nozzle needle (3) of at least one nozzle (2), respectively, is variable and highly precisely moved for the introduction by means of a device and in such a way that additive (17) is dosed exactly in relation to the volume flow of the medium and that a pulsating stream (18, 36) is injected into the medium flowing past, by means of at least one well-aimed nozzle opening (4). The additives are dosed by means of a pressure that can be variably adjusted by pulse width and pulse frequency. The desired homogenous distribution is obtained by the penetrating injection jet (37) during compounding.

15 Claims, 20 Drawing Sheets

U.S. PATENT DOCUMENTS

| | | |
|---|---|---|
| 3,990,422 A | 11/1976 | Watson et al. |
| 4,474,717 A | 10/1984 | Hendry |
| 4,563,782 A | 1/1986 | Dijkhuizen |
| 4,657,496 A | 4/1987 | Ozeki et al. |
| 4,689,923 A * | 9/1987 | Goudeaux et al. ............ 451/99 |
| 4,770,198 A | 9/1988 | Bergman |
| 4,907,516 A * | 3/1990 | Rogers ....................... 111/127 |
| 4,931,236 A | 6/1990 | Hettinga |
| 5,066,137 A | 11/1991 | King |
| 5,286,184 A | 2/1994 | Nakayama |
| 5,638,791 A | 6/1997 | Tsuzuki et al. |
| 5,913,324 A | 6/1999 | Signer |
| 5,934,521 A | 8/1999 | Yamada et al. |
| 6,284,810 B1 | 9/2001 | Burnham et al. |

* cited by examiner

FIG.: 1
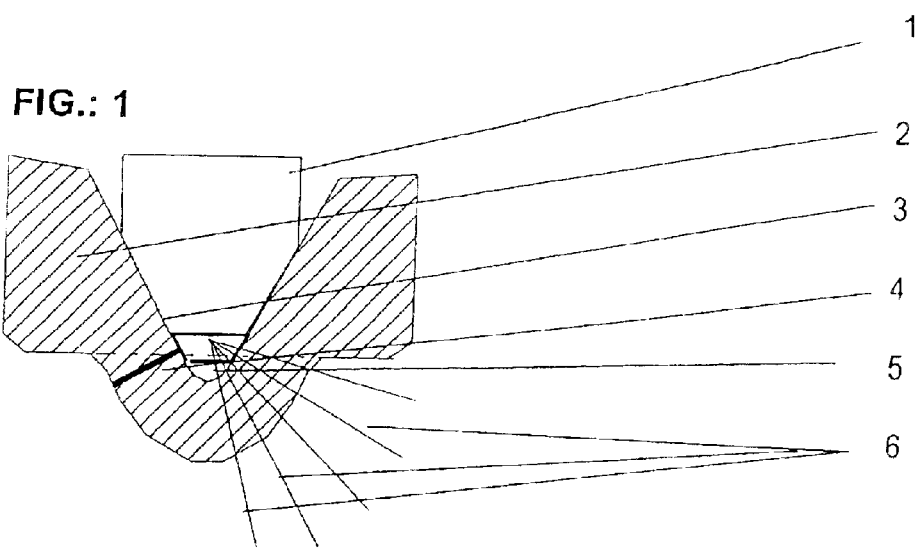
FIG.: 2
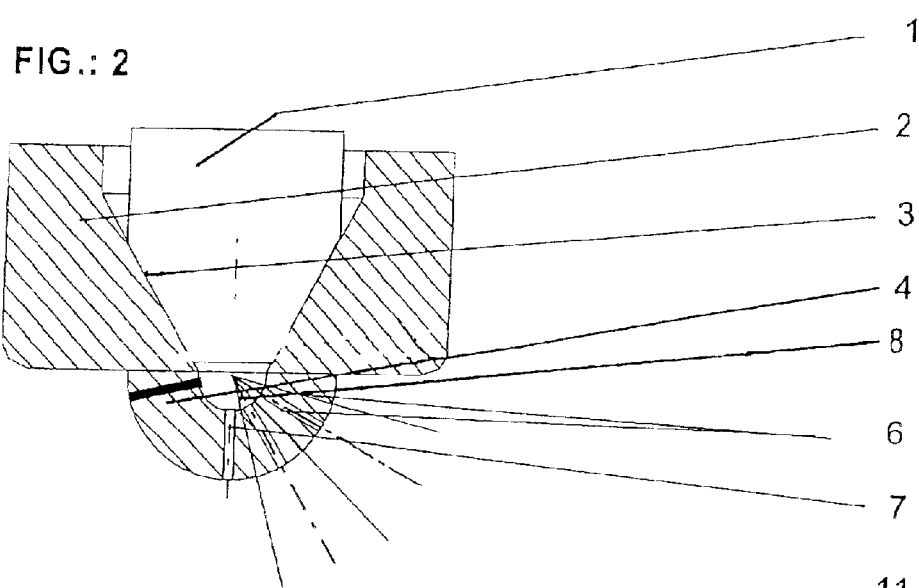
FIG.: 3
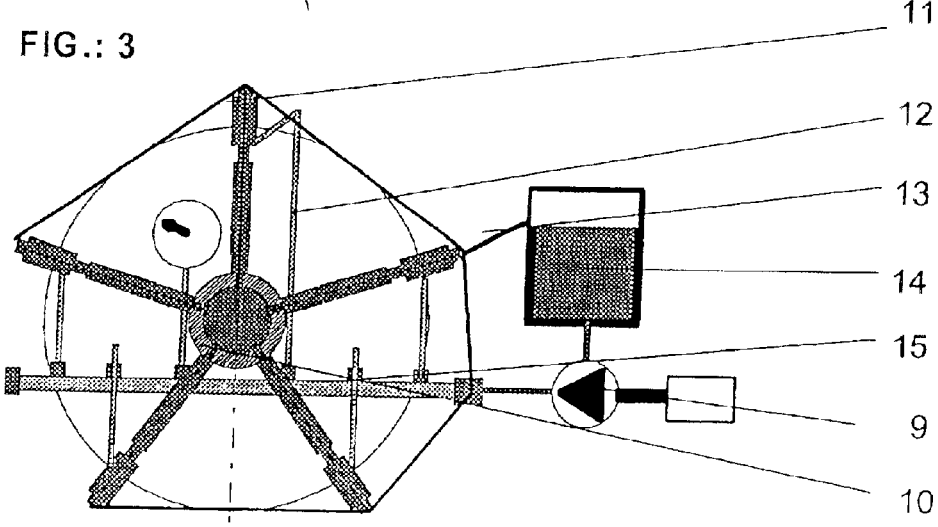

FIG.: 4
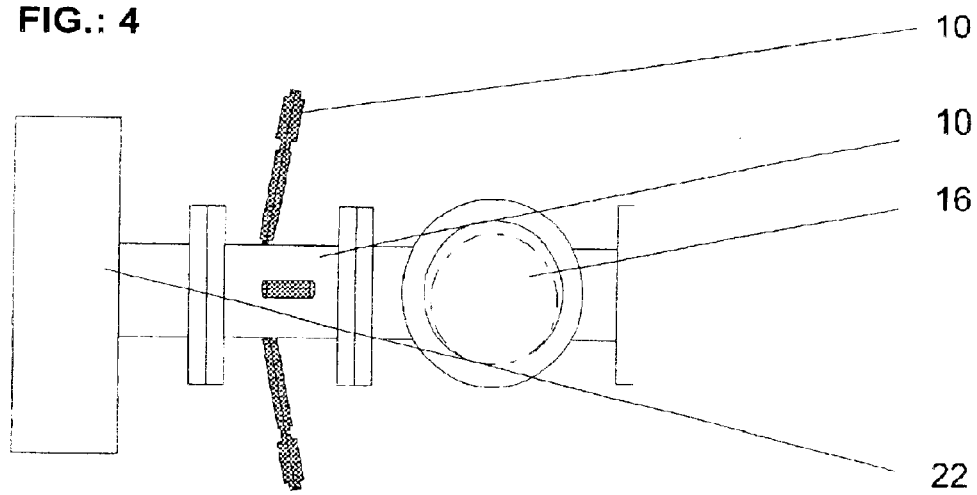
FIG.: 5
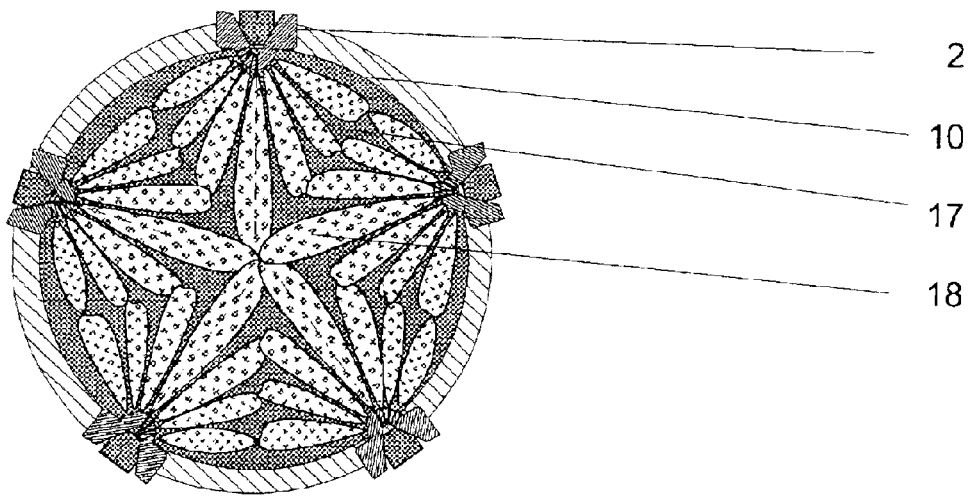
FIG.: 6
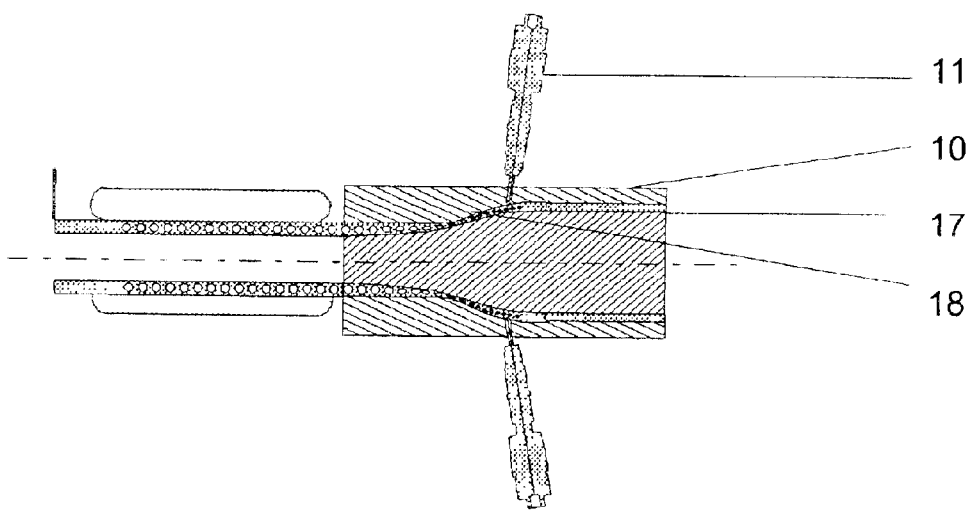

FIG.: 7
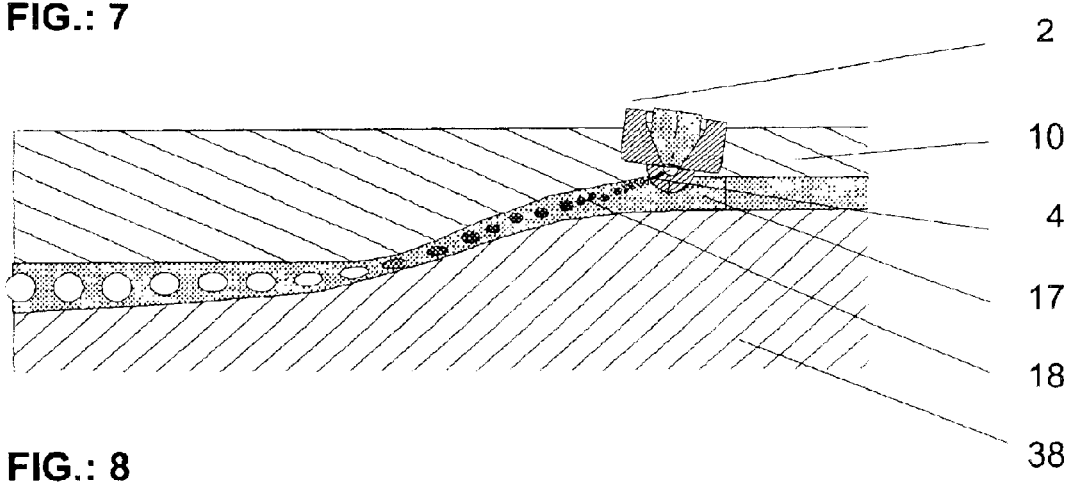
FIG.: 8
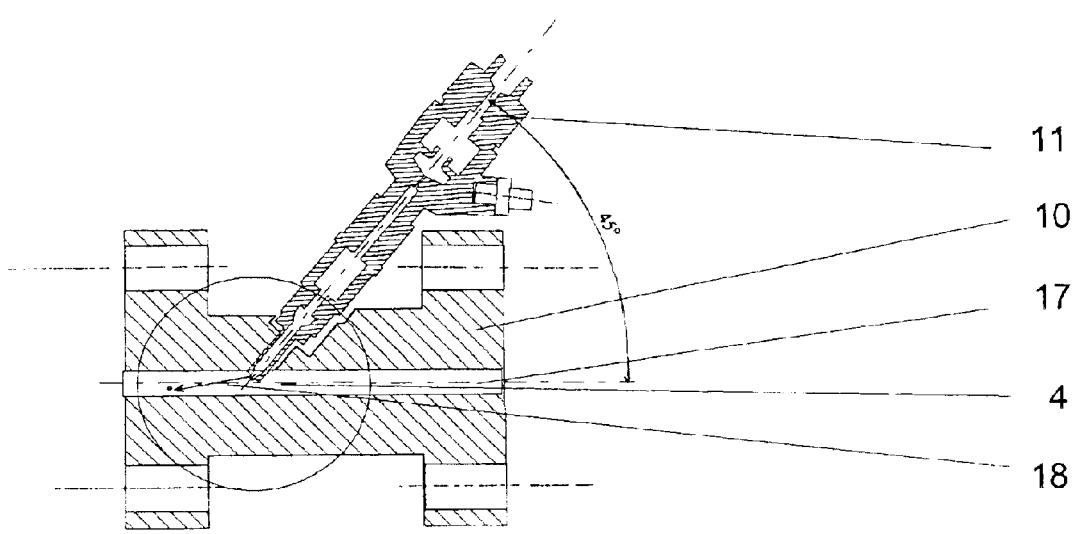
FIG.: 9
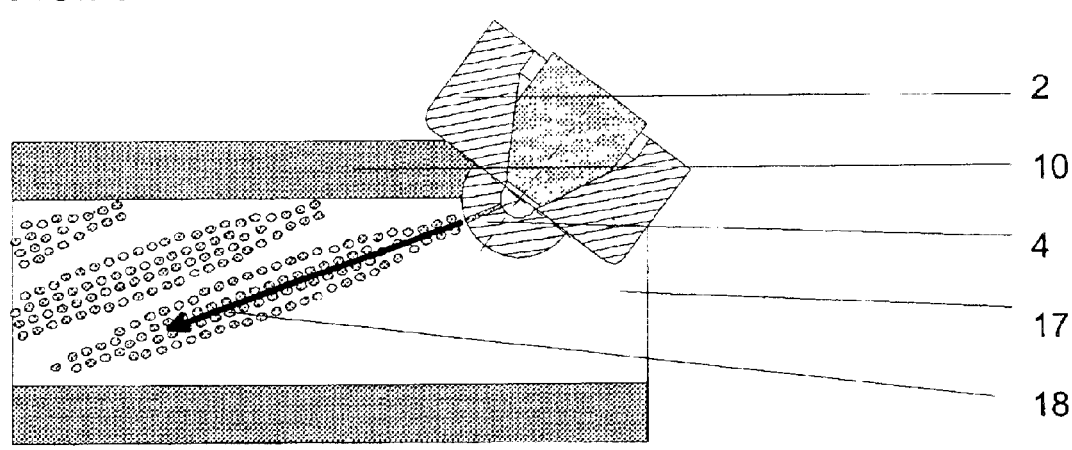

FIG.: 10
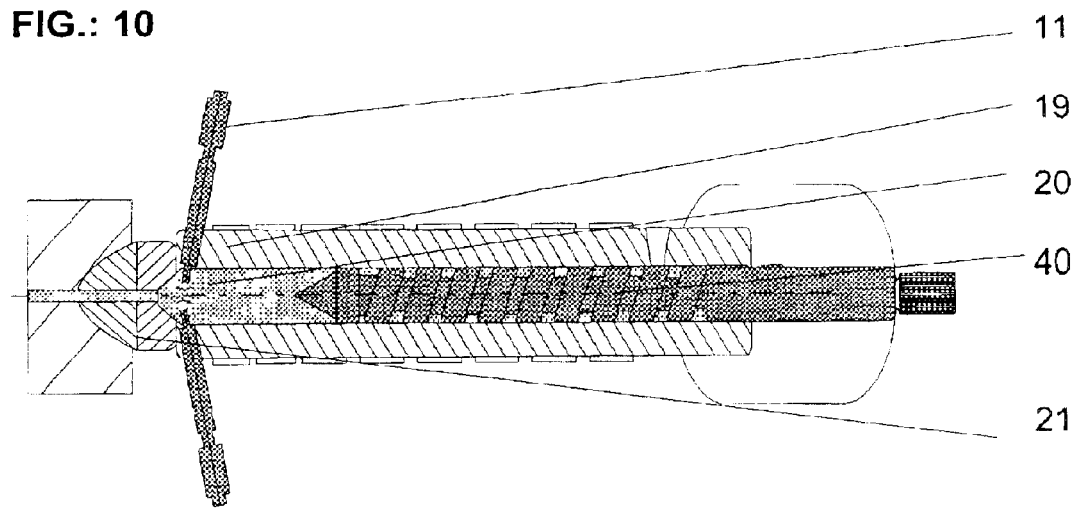
FIG.: 11
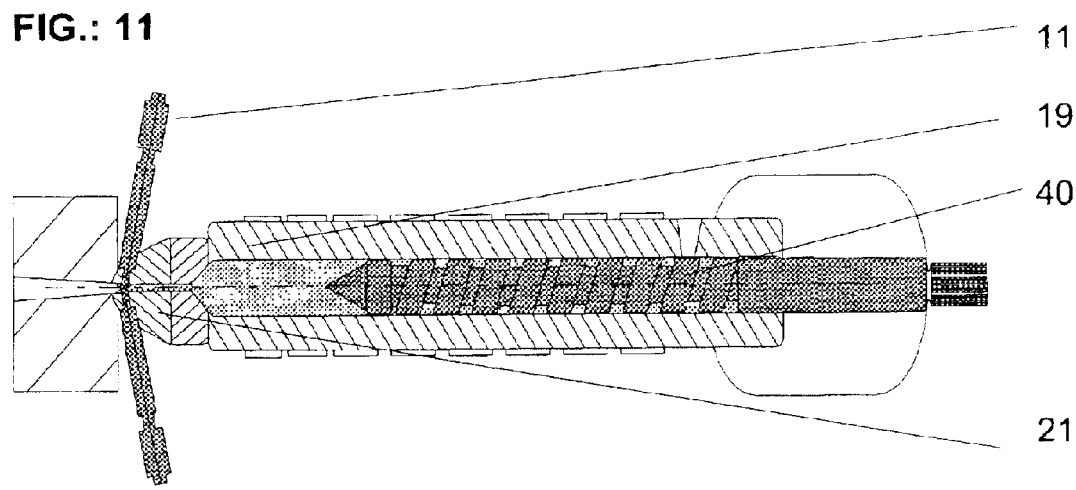
FIG.: 12
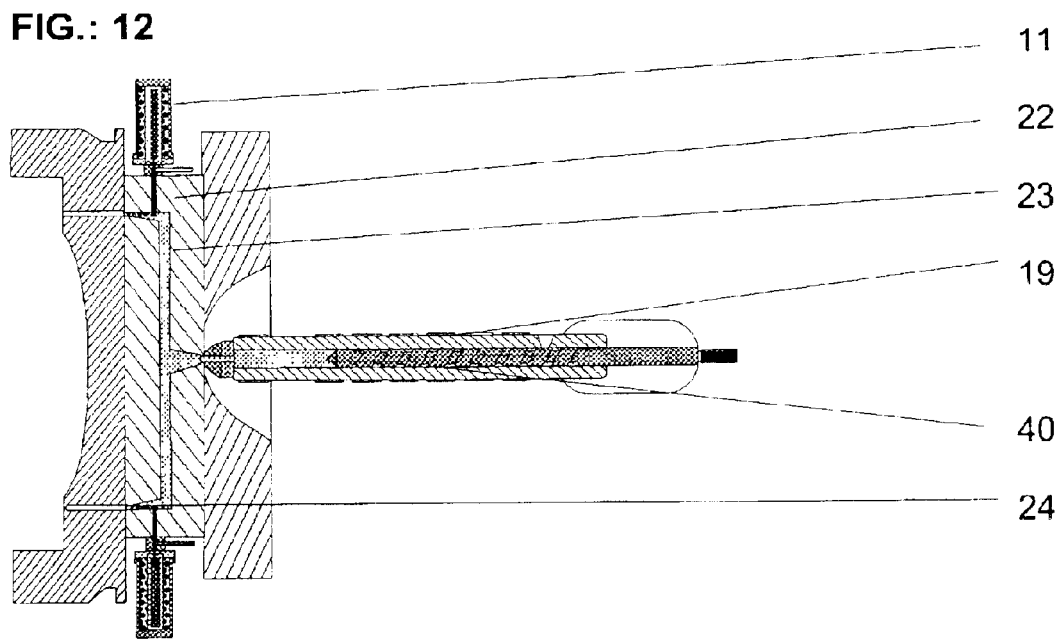

FIG.: 13
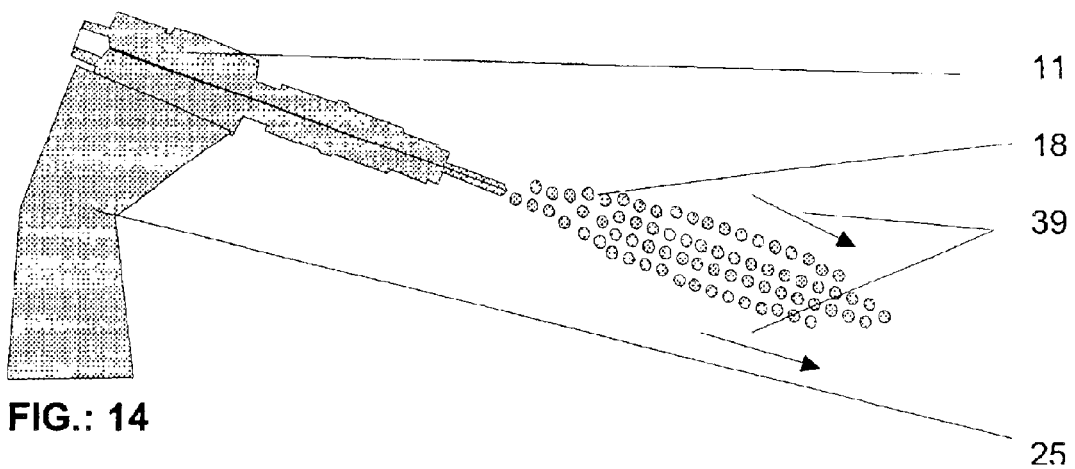
FIG.: 14
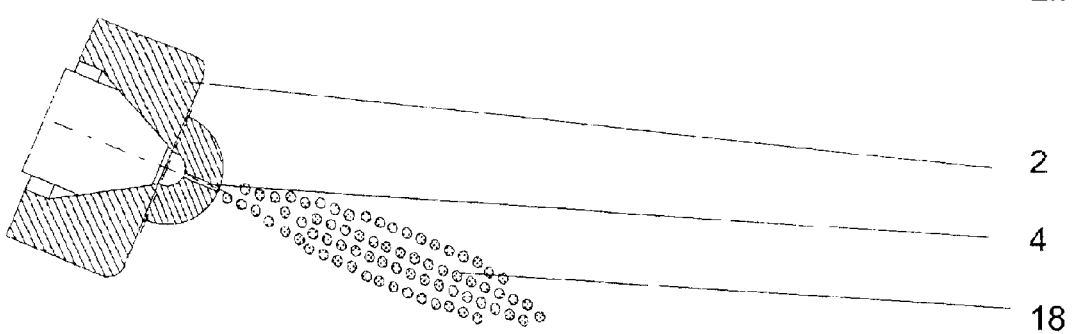
FIG.: 15
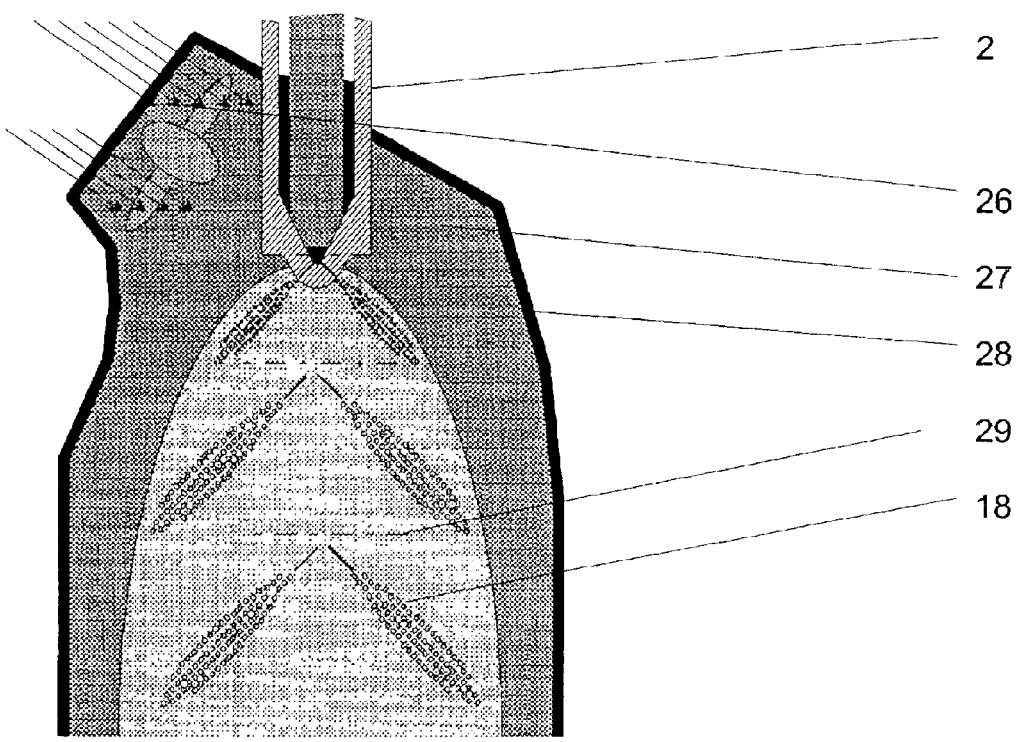

FIG.: 16 a     FIG.: 16 b
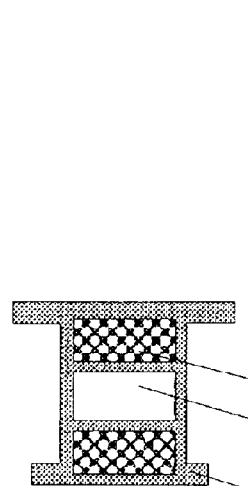
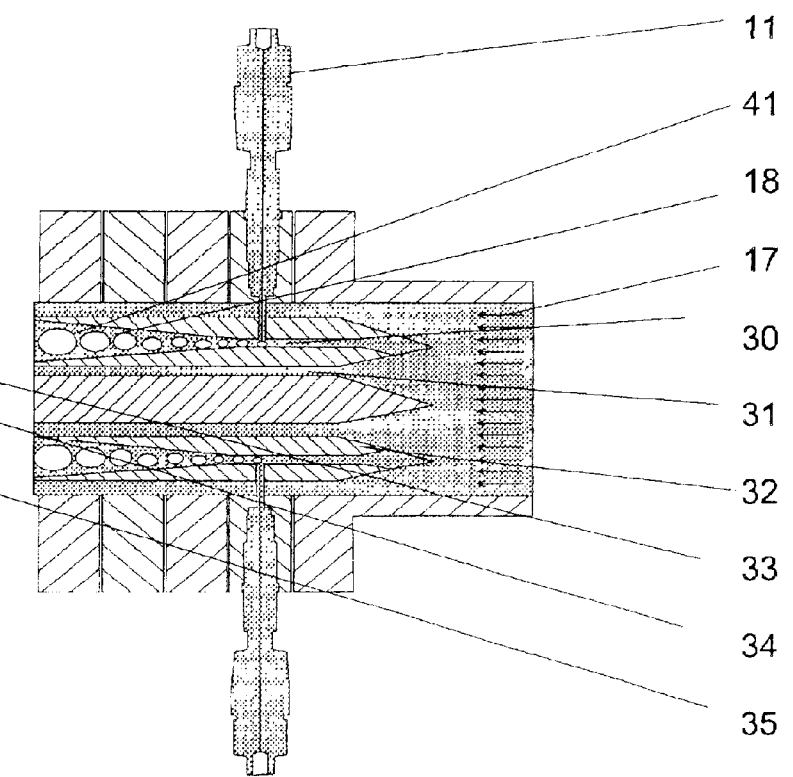
FIG.: 17 a     FIG.: 17 b
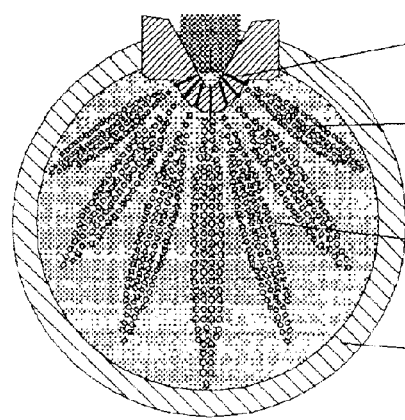
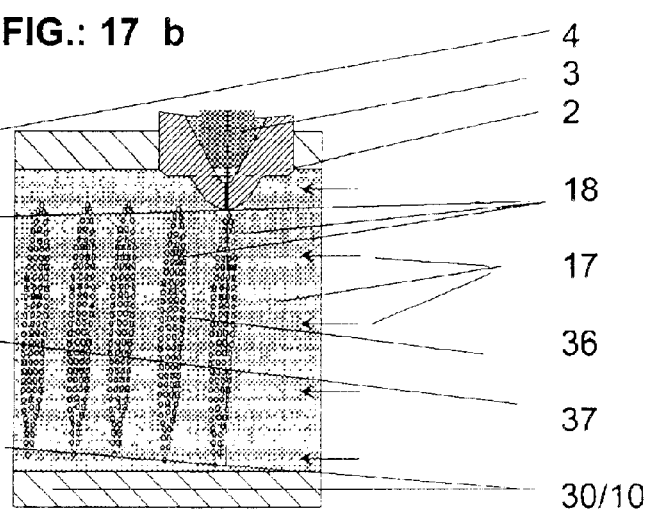

FIG.: 18
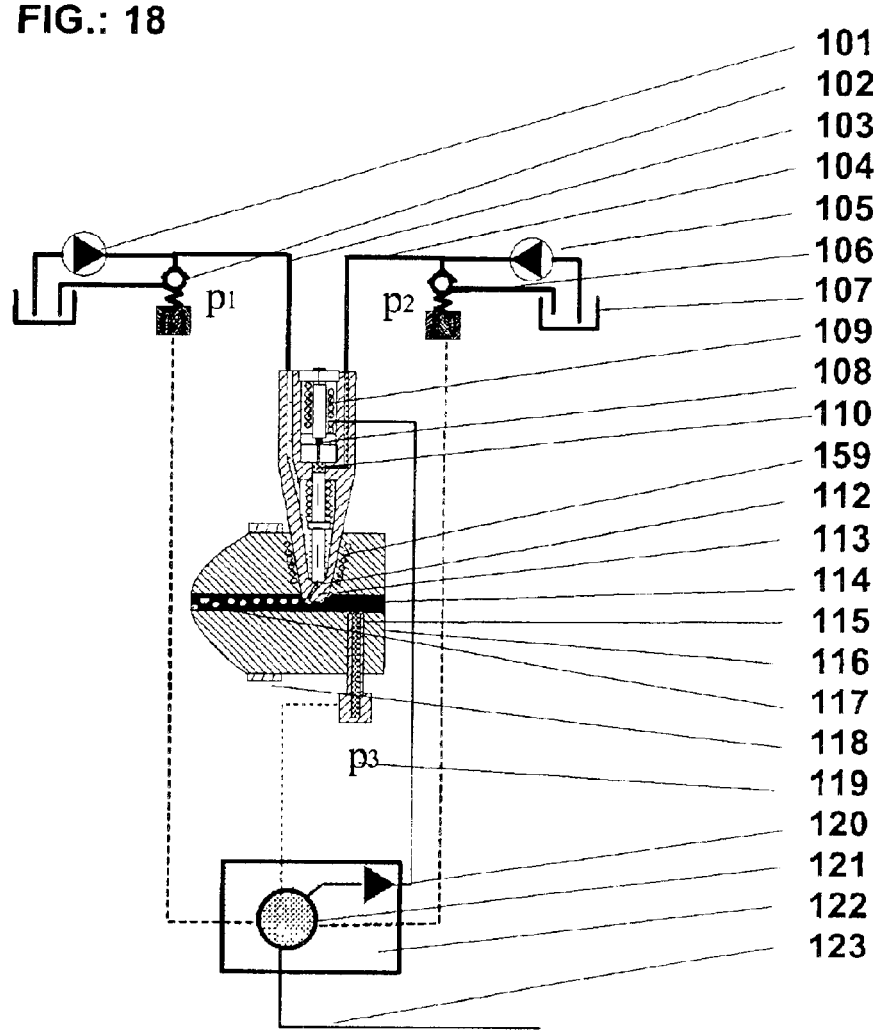
- 101
- 102
- 103
- 104
- 105
- 106
- 107
- 109
- 108
- 110
- 159
- 112
- 113
- 114
- 115
- 116
- 117
- 118
- 119
- 120
- 121
- 122
- 123
FIG.: 19
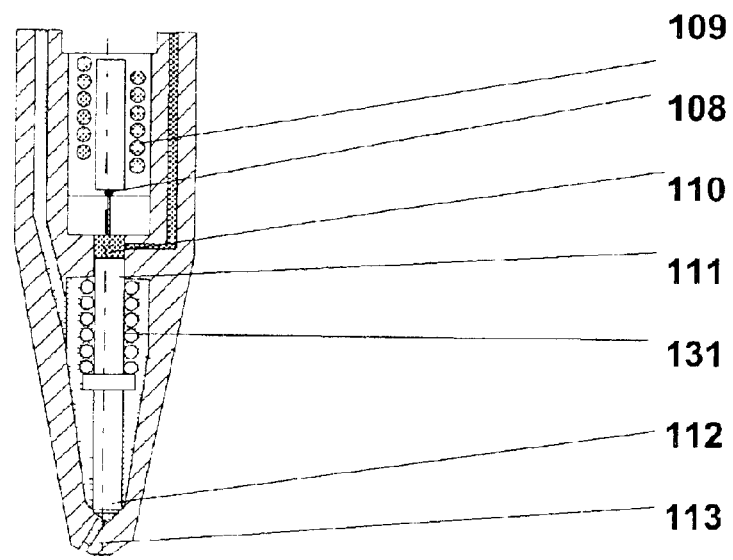
- 109
- 108
- 110
- 111
- 131
- 112
- 113

FIG.: 20
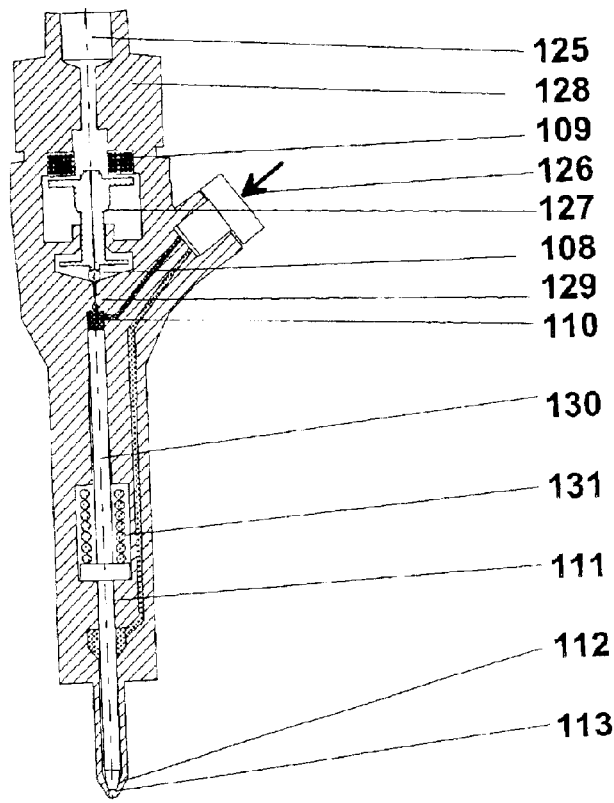
FIG.: 21
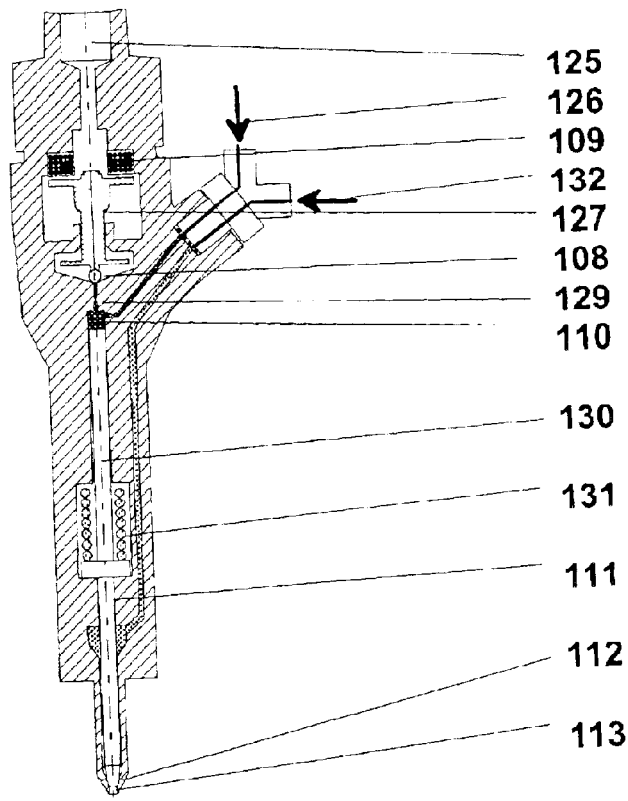

FIG.: 22
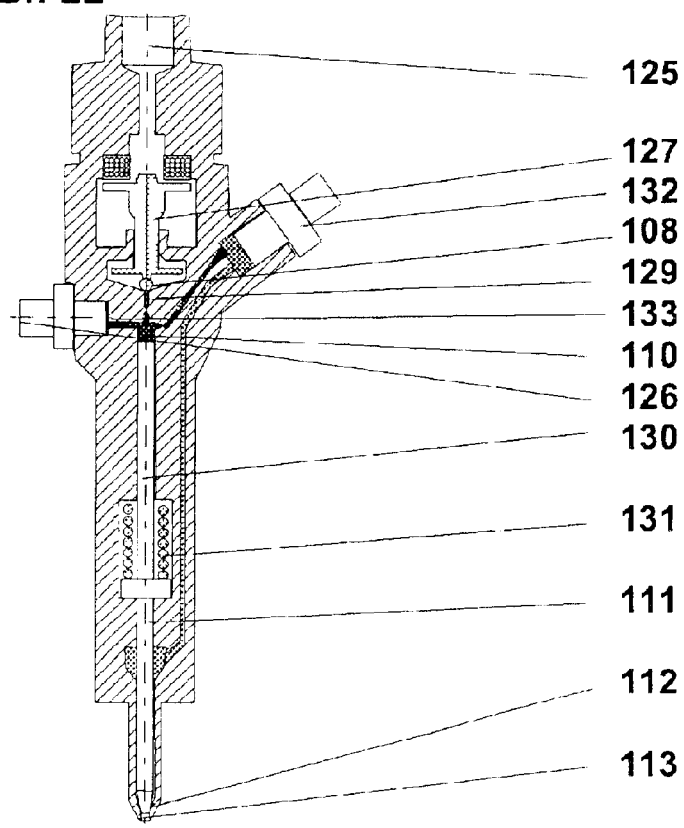
FIG.: 23
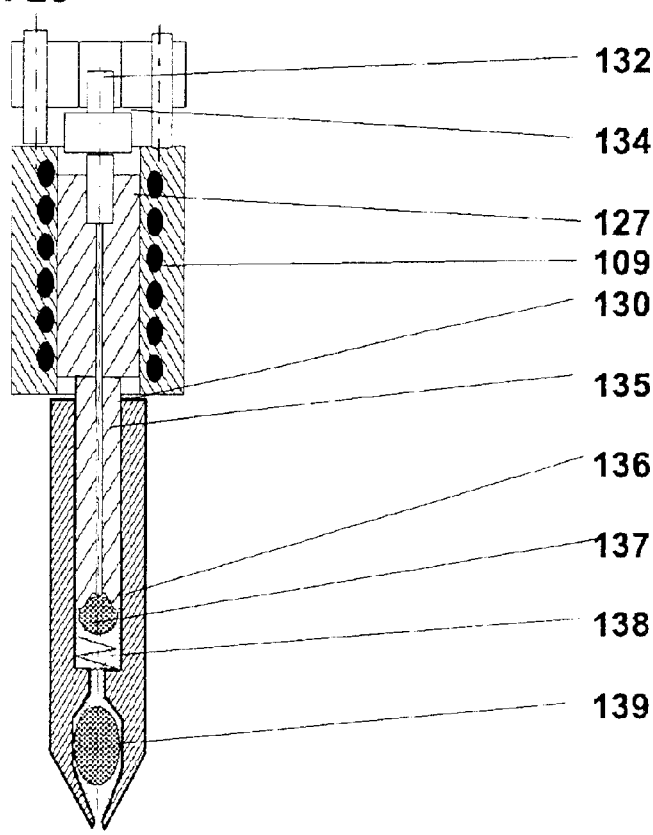

FIG.: 24
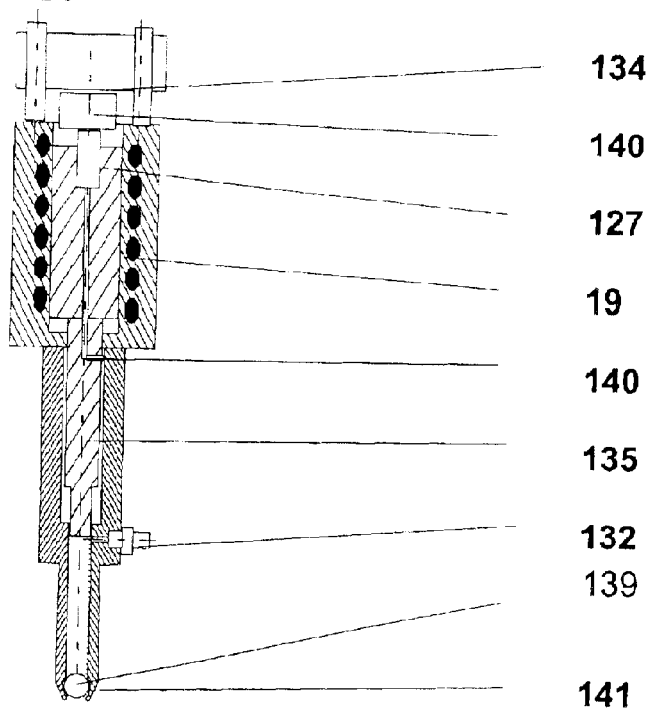
- 134
- 140
- 127
- 19
- 140
- 135
- 132
- 139
- 141
FIG.: 25
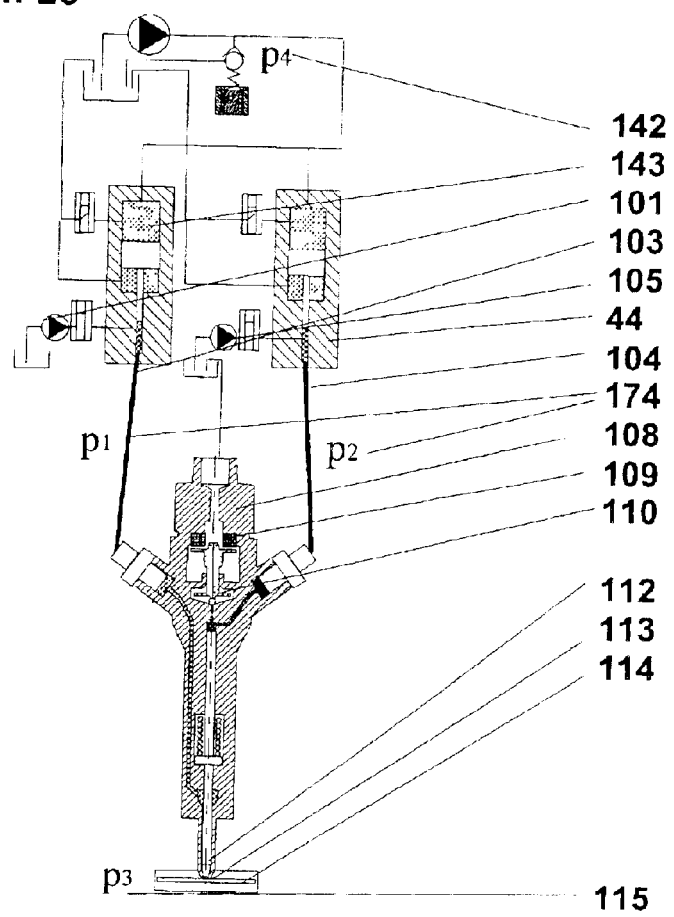
- 142
- 143
- 101
- 103
- 105
- 44
- 104
- 174
- 108
- 109
- 110
- 112
- 113
- 114
- 115

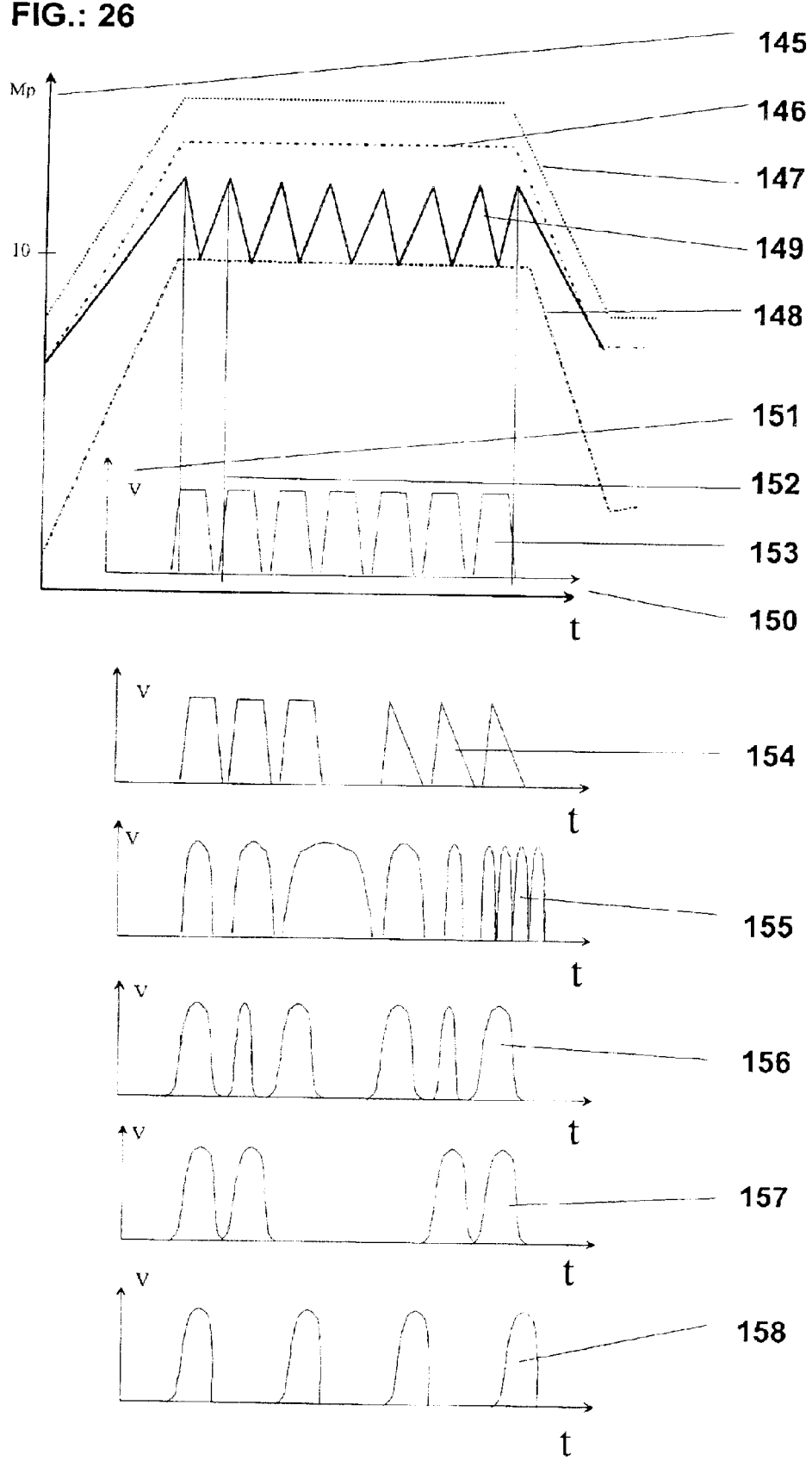
FIG.: 26

FIG.: 27
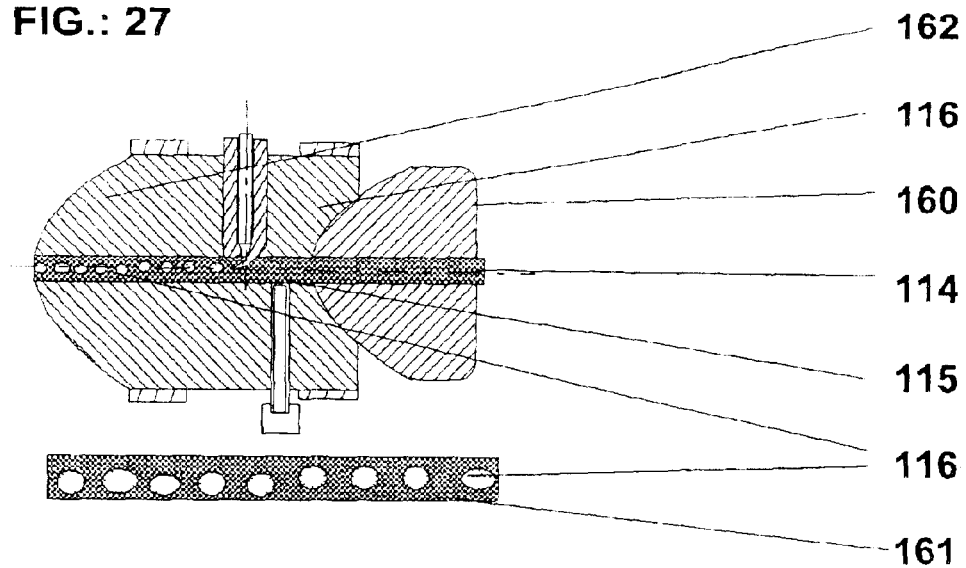
FIG.: 28
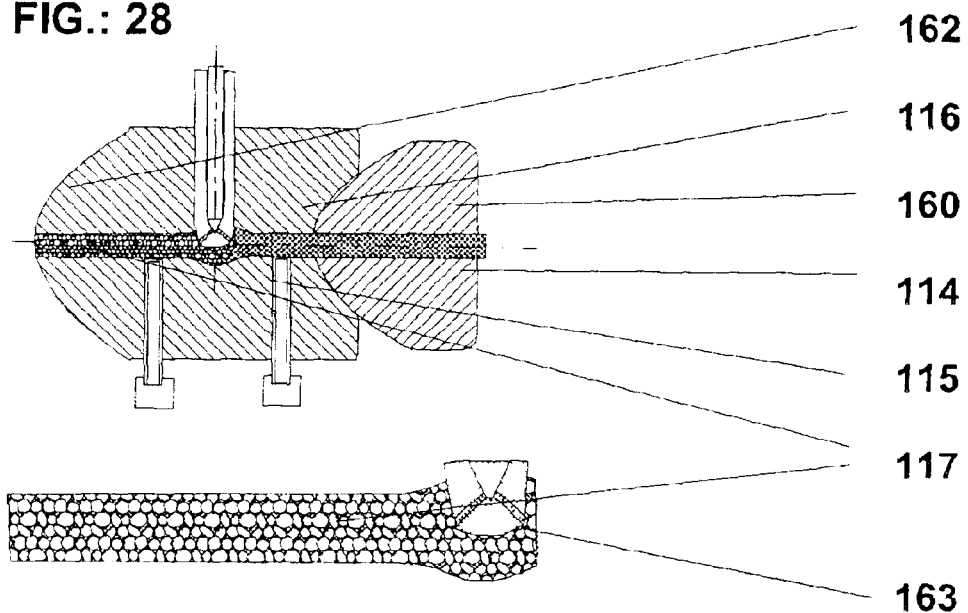
FIG.: 29
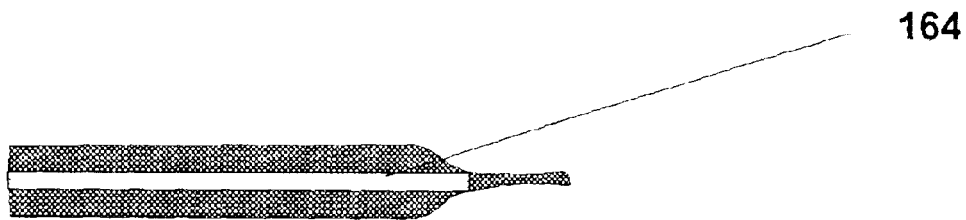

FIG.: 30
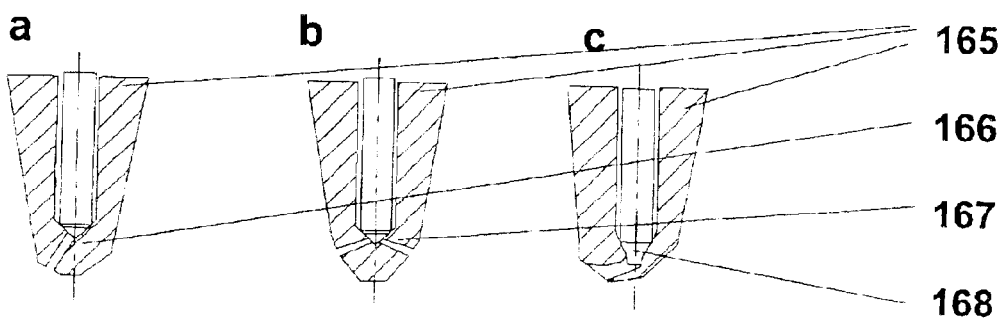
FIG.: 31
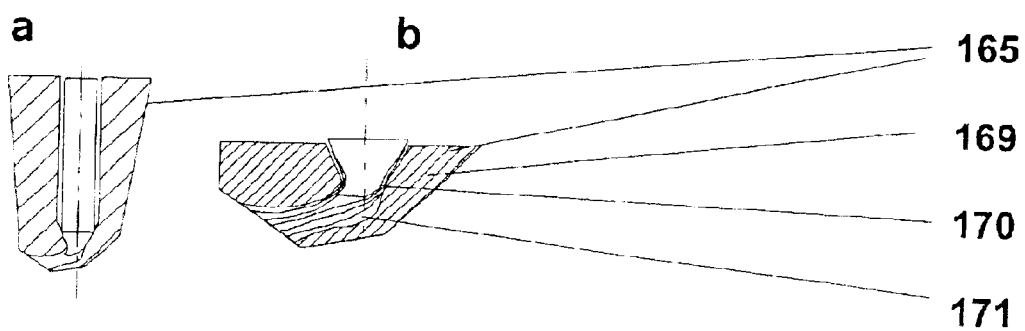
FIG.: 32
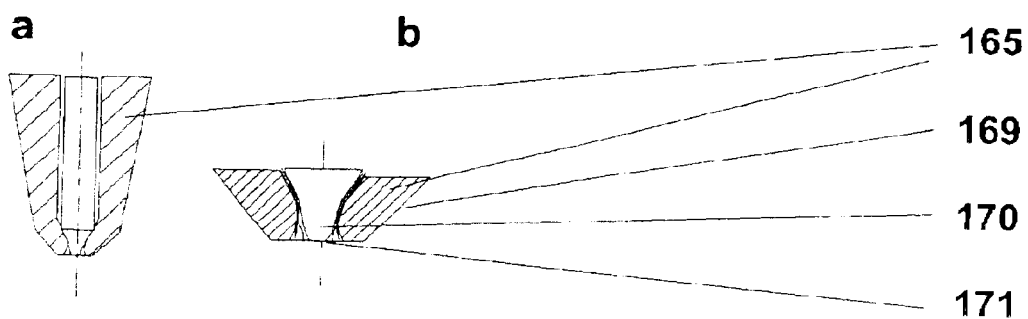
FIG.: 33
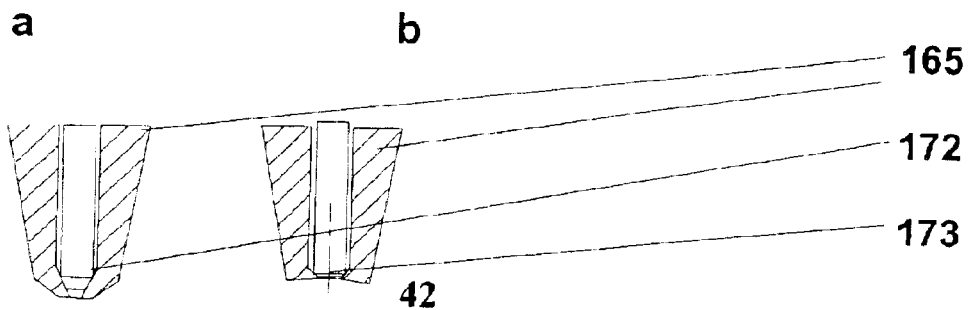

FIG.: 34
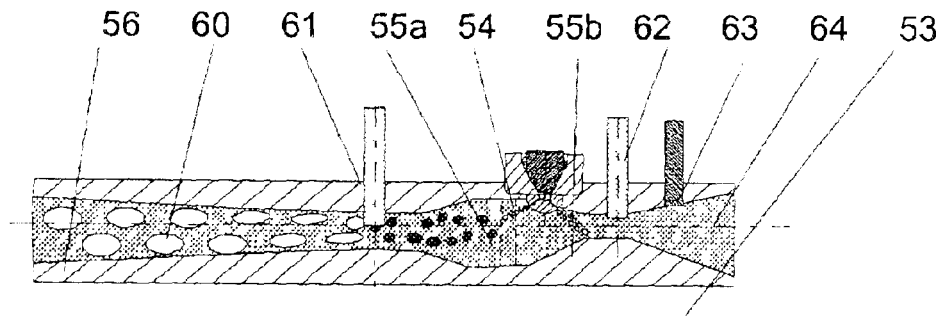
FIG.: 35
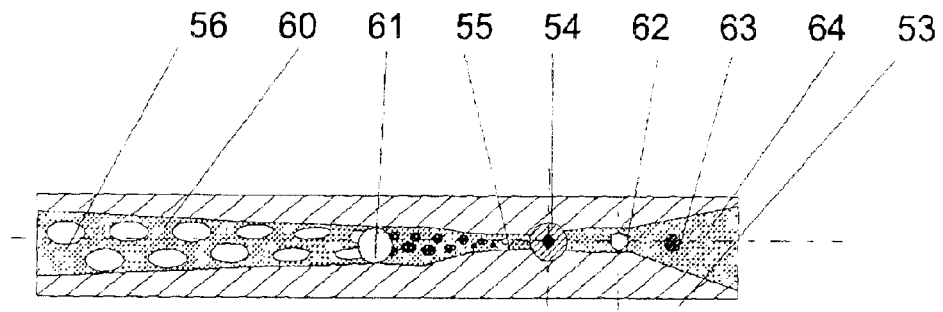
FIG.: 36a
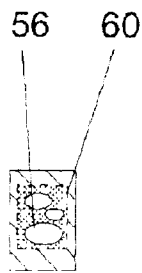
FIG.: 36b
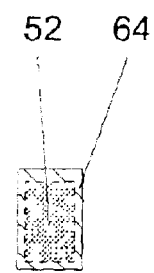
FIG.: 37a
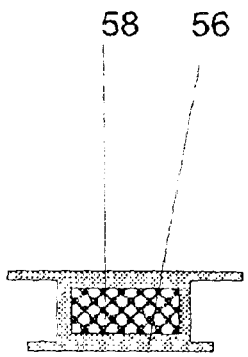
FIG.: 37b
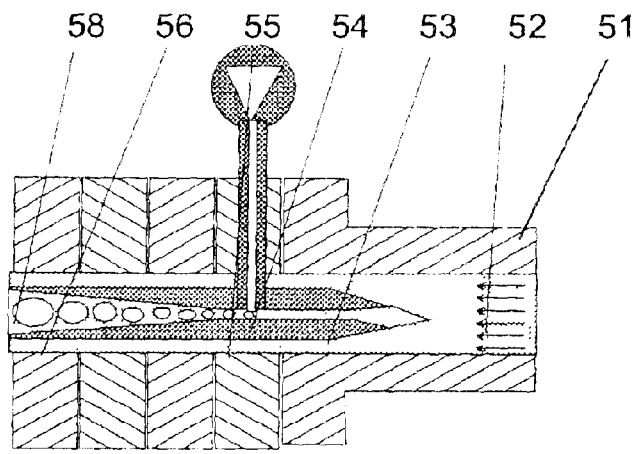

FIG.: 38
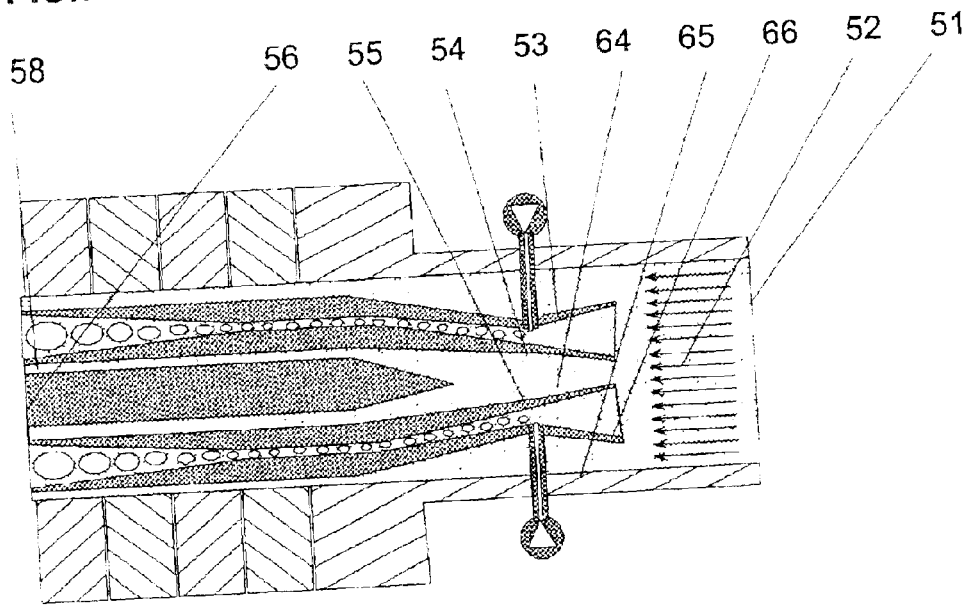
FIG.: 39
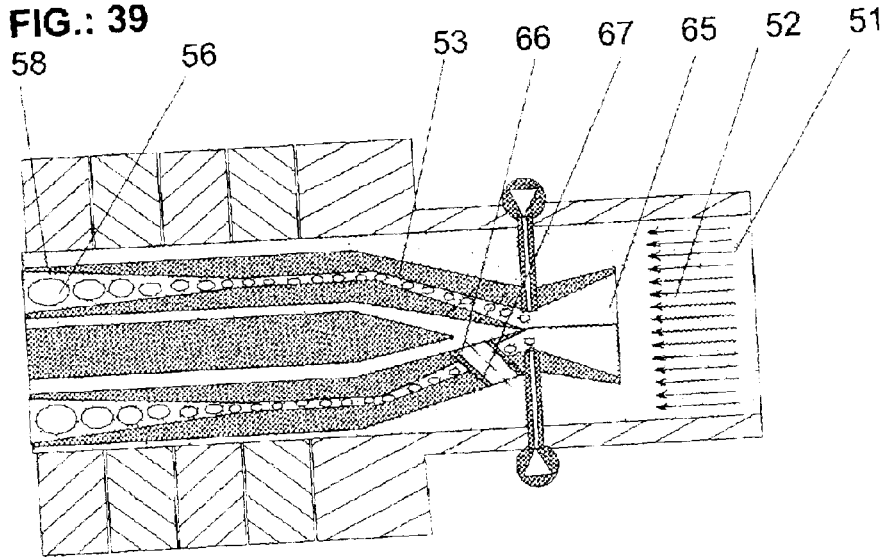
FIG.: 40a 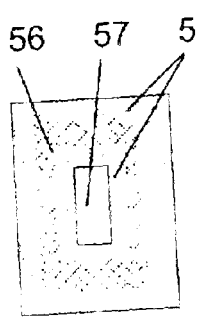 40b 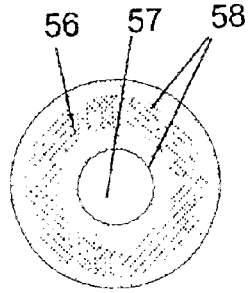 40c  40d 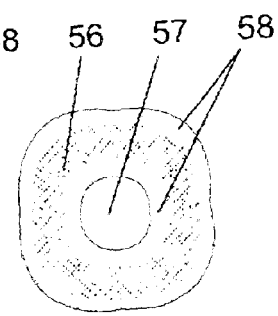

FIG.: 41
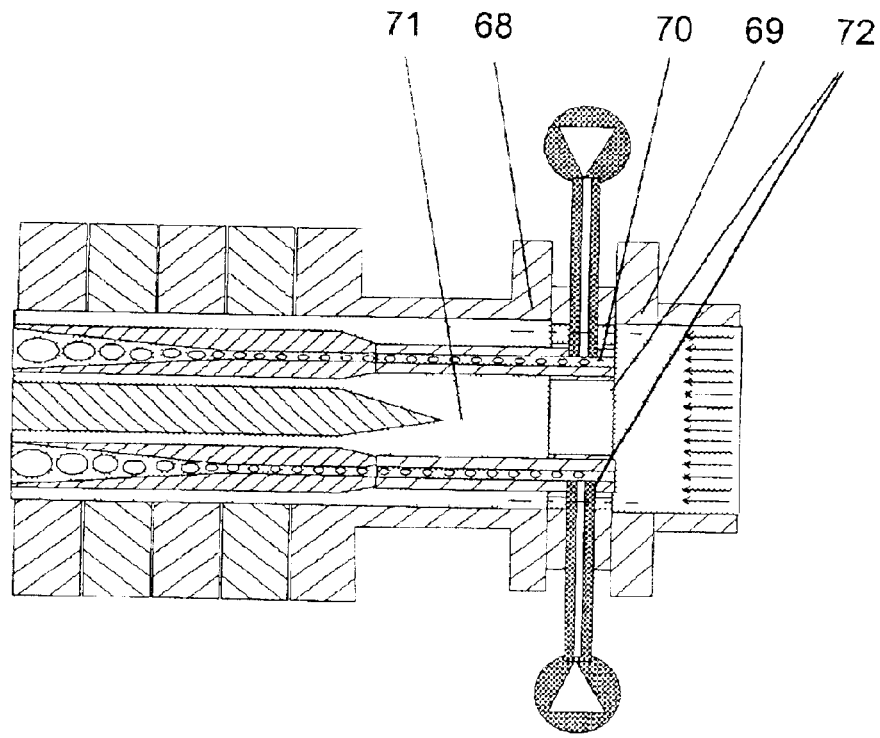
FIG.: 42
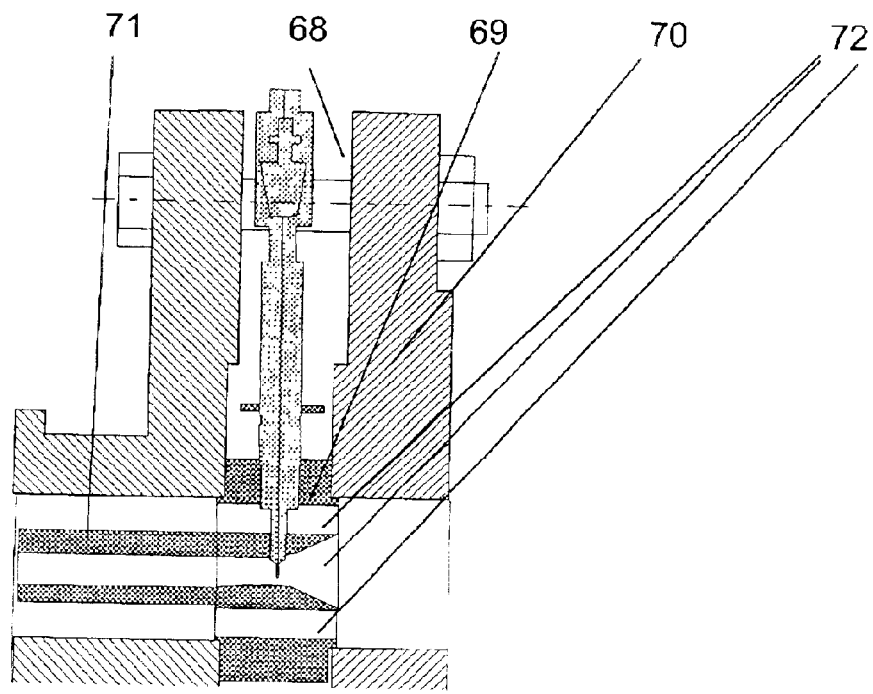

FIG.: 43
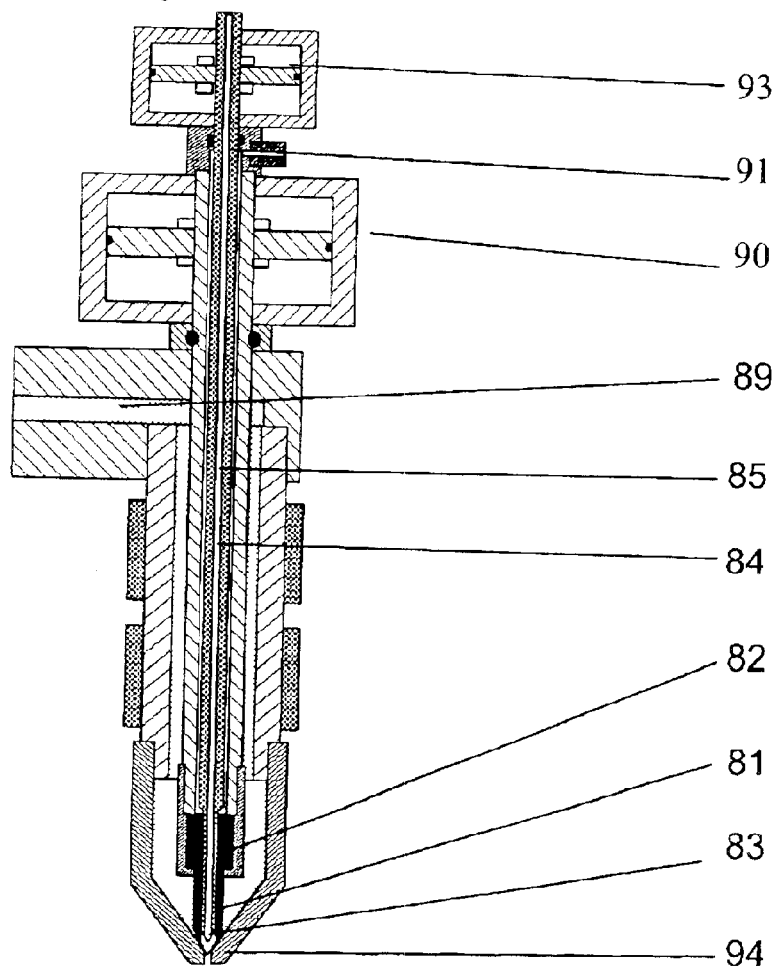
Prior Art
FIG.: 44
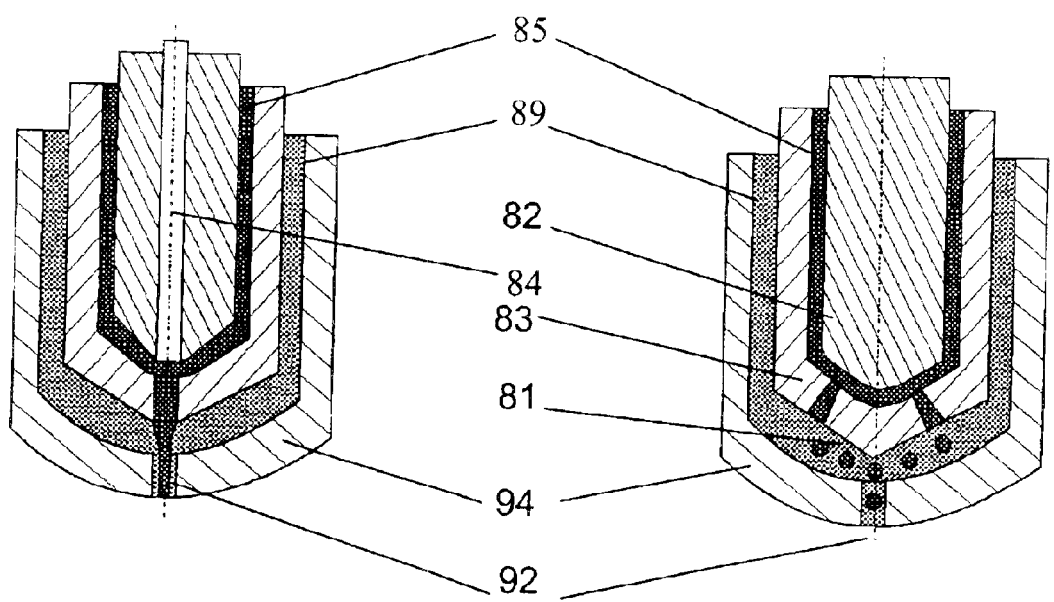

FIG.: 45A
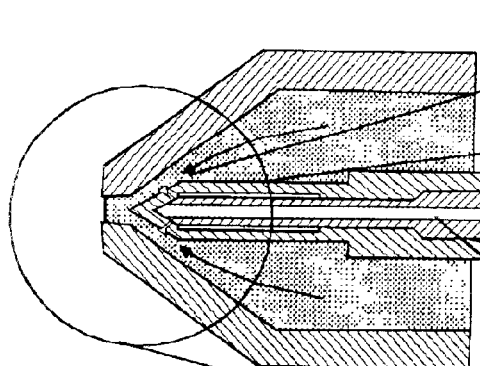
FIG.: 46A
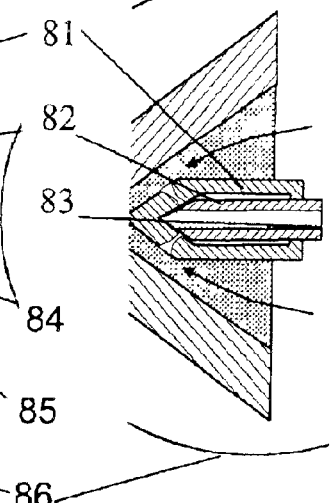
FIG.: 45B
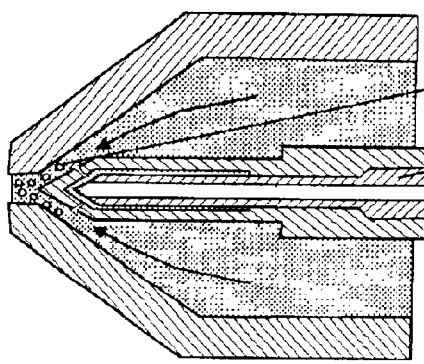
FIG.: 46B
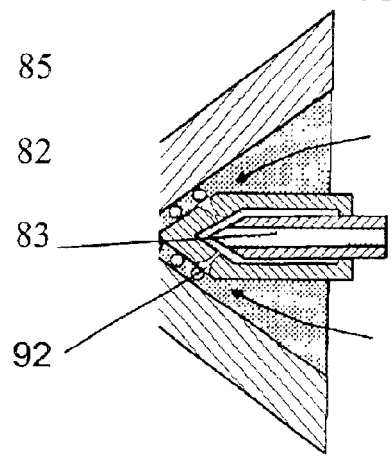
FIG.: 45C
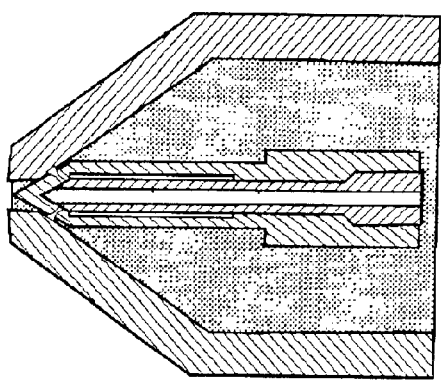
FIG.: 46C
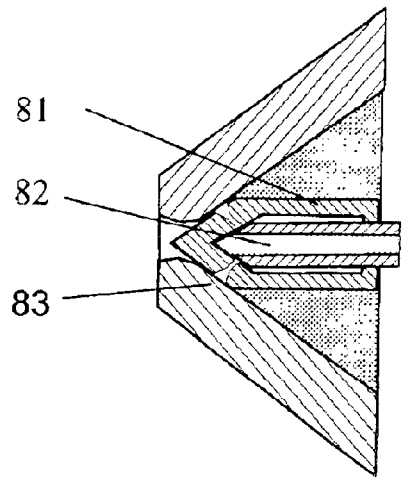

FIG.: 47
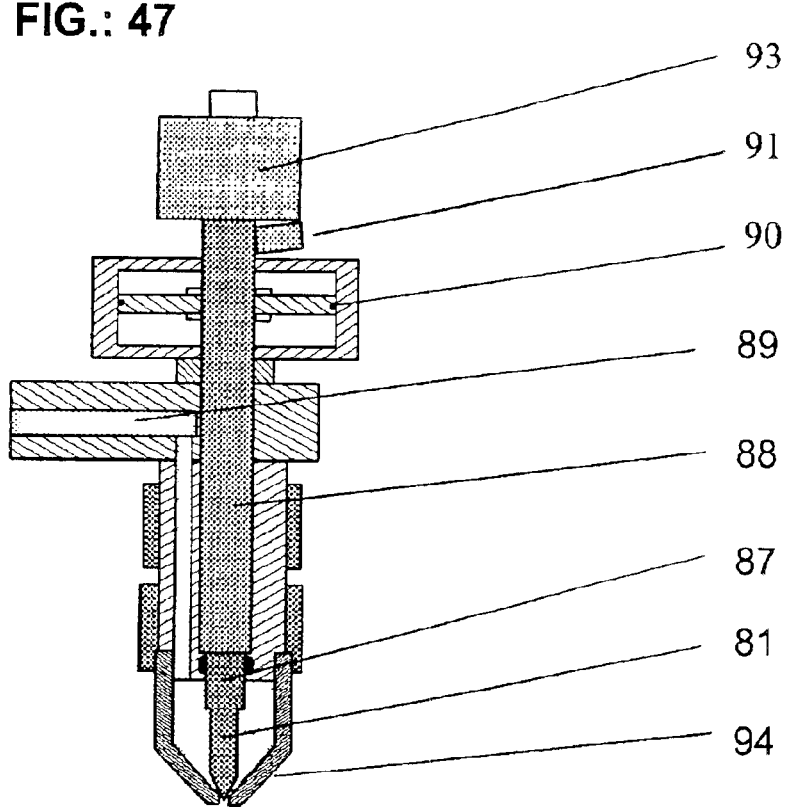
FIG.: 48
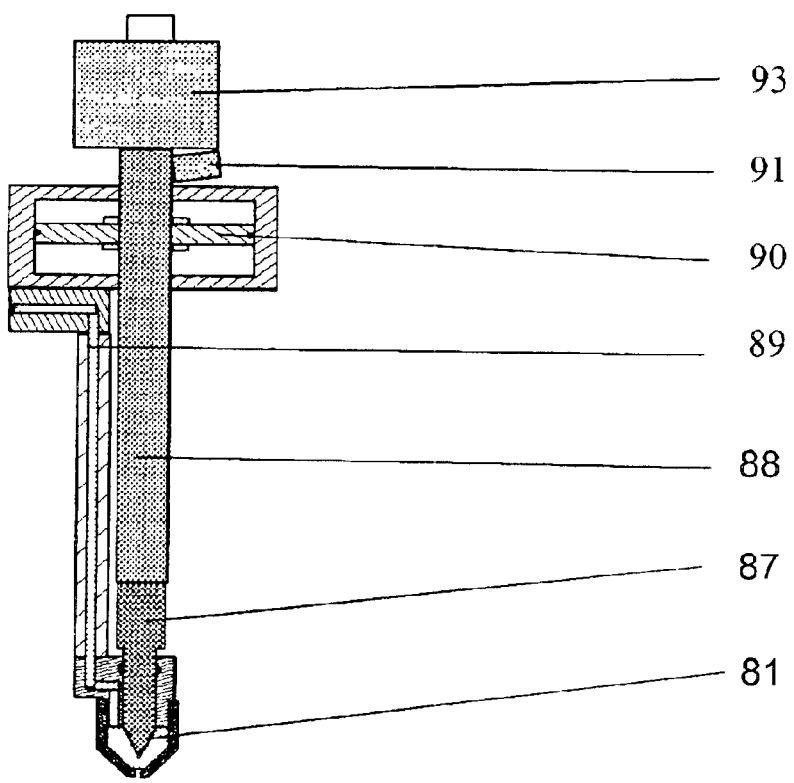

FIG.: 49
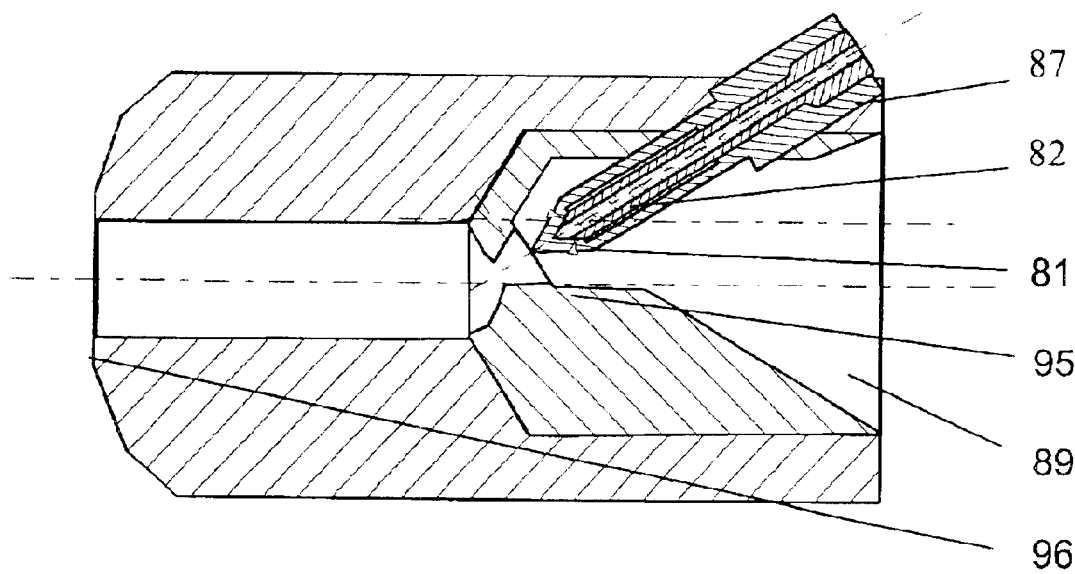
FIG.: 50
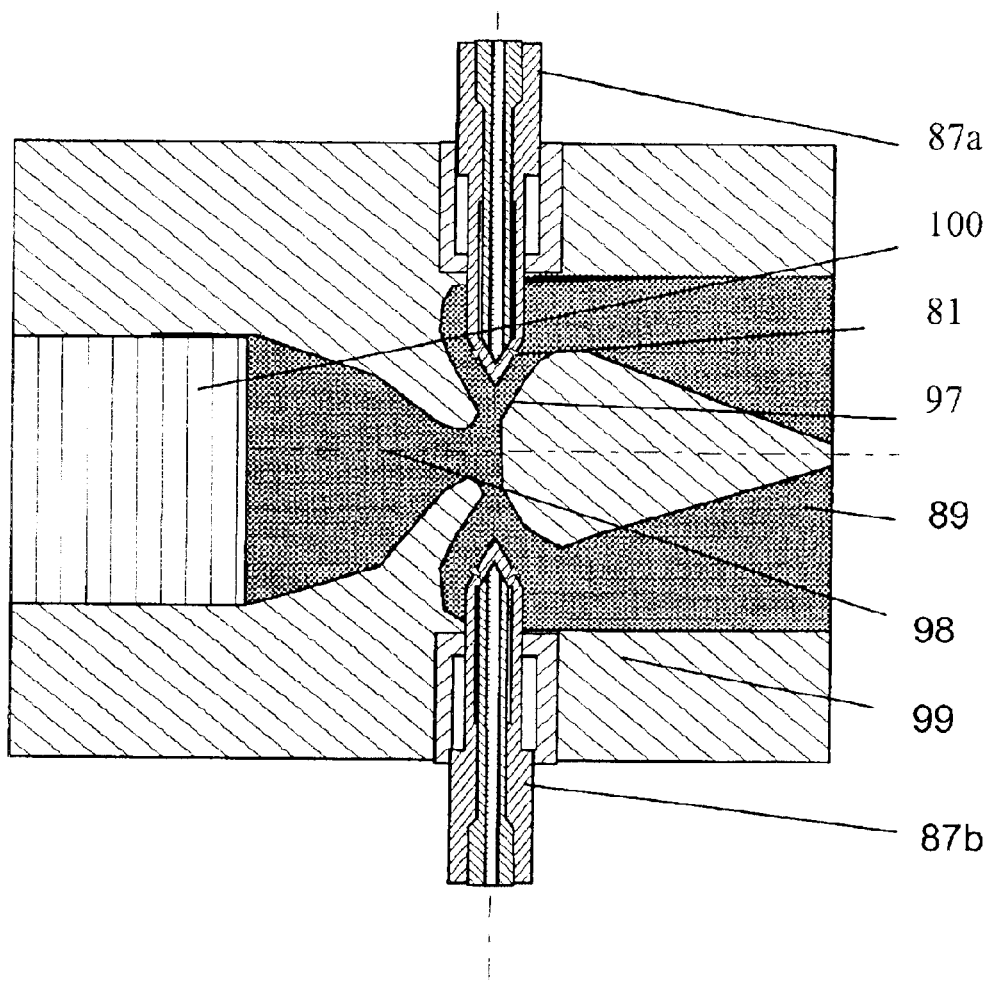

METHOD FOR INTRODUCING ADDITIVES

METHOD FOR INTRODUCING ADDITIVES

The invention relates generally to a method for introducing additives into flowing or fluidised media with specific application for plasticating processes although not limited thereto.

The spatially predetermined position of the additives in the flowing material, also called fluid bed, is obtained by controlling the pulsating injection. The introduction and exact dosing of additives, that is hardeners, dyes, gas producers and softener for instance, into a liquid plastic stream or metal stream for instance or the fluid bed of bulk material, such as powder, granules and pellets, is carried out by means of an injector. The invention is used in melting units, in hot channel systems, in tools, components of tools and injection moulding machines, extruders, injection moulding, pelletizing, burner and injection arrangements. The nozzle needle of at least one nozzle respectively is variable and highly precisely moved for the introduction by means of a device and in such a way that an additive is dosed exactly in relation to the volume flow of the medium and that a pulsating stream is injected into the medium flowing past the pulsating stream, by means of at least one well-aimed nozzle opening. The additives are dosed by means of a pressure that can be variably adjusted such as by pulse width and pulse frequency. The desired homogenous distribution is obtained by the penetrating injection jet during compounding for instance.

BACKGROUND

In U.S. Pat. No. 4,474,717, by James W. Hendry, dated 1982, an injection of spatially predetermine position is disclosed, specifically, injection of a small portion of plastics without introducing inert gas (preloading) followed by sectional introduction of inert gas using frequencies from 4 to 100 cycle per second having a pressure of 300–1500 psi (2 to 10 MPa) into the continuous passing plastic material. The result is a multi layered inside foamed structure. The present invention expands this method by applying injection technology used in the combustion engine technology. Reaching a more intensive penetration by higher pressure (40 to 200 MPa), higher frequency (100 to 1000 hz) and more exact dosing by controlled width of the pulses, frequency of the pulses and regulation of pressure using this technology. Various designs of nozzle and channels utilizing hydromechanical principles can be achieved for metal, bulk materials and highly viscous melts.

The following devices and methods are subject of previous solutions:

i) EP161614, WOLTON FRANK, 1985, shows a device for injection of certain amount of medium into the fluid stream. The adding of the additives happens by a charging pump which is activated by the flowing medium. Energetic mixing is not possible because of the small pressure difference.

ii) A device for adding additives into a liquid stream of high viscosity has been disclosed in U.S. Pat. No. 5,913,324, SIGNER ARNO, 1997. By diaphragm the high shear forces of the medium with high viscosity is provided for the mixing to take place. A dosing is happening in the side stream and independent of the main stream.

iii) A device of adding additives after the plasticizing unit is shown in EP0432336, CLOMP PHILLIP, 1991.

iv) For the adding of additives after the plasticizing unit the following methods are known.

a). WO89053226, HETTINGA SIEBOLT, 1988 shows blowing in of air.

b) U.S. Pat. No. 4,931,236, HETTINGA SIEBOLT, 1989 shows spraying in of air/gas after the plasticizing to achieve a hose with a foamed layer.

c) DE1948454, BAYER, 1971 shows injection of a chemical gas producer after plasticizing unit.

A mixing by energetic injection jet stream and pulsing dosing is not the subject of the last named inventions.

v) A nozzle for application of glue by pulsation is shown in U.S. Pat. No. 5,934,521, KOIKE KATSUHIKO, 1998. The nozzle-needle is activated by a pneumatic cylinder up and down, so that glue pours out in pulsing way. A mixing with a flowing medium passing by is not on purpose.

The pulsing adding of liquid and gas is state of the art in burner systems, airless jet systems and spraying systems (atomizers). The present invention is demarcating from these application by higher pressure of the liquid than 40 MPa and high energetic atomizing. This pressure is not possible with the nozzles used at this time. Only by electrical activated hydraulic servo valves in common rail technology can these pulsation be realized.

SUMMARY OF THE INVENTION a) General Description of the Invention.

The basic concept of the inventive method for introducing additives consist of obtaining intensive atomizing, mixing and deep penetrating of additives into the medium stream by using high kinetic energy of the additives and exact timed pulsing and exact pulse width using appropriate injectors.

The exact dosing of the additives is obtained by regulation of the operation parameters of introduction for instance pressure, frequency, pulsing width, etc.

The state of the art of combustion engines using the "common rail" injection technology is utilized. The flexibility of this system by modifying the operating parameters is the highlight of this technology in comparison to the present mechanical operated injection methods because there is injection nozzle, etc. The common rail is loaded with fuel being pressurized up to 200 MPa and supplies the injector with this constant pressure. Electronic controller activating solenoid and piezo-operated, electro-hydraulic servo-valves move the nozzle needle by push rods with high precision. According to this technology exact dosing and homogenous distribution will be obtained.

The application and further development of this injection technology is subject to utilizing this improved technology for further applications as mentioned before. Furthermore detailed design and configuring of nozzles, nozzle-needles, the arrangement of orifices in position and shape as well as arrangement of injectors are aspects of this invention.

b) Description and Economical Benefit of the Present Invention.

i) Introduction into the plastic melt stream. The introduction happens after the plasticizing unit. This is for many processes listed below having advantages noted. Producing material of different properties out of one Plasticizing unit is possible.

ii) For injection moulding systems, predetermined properties like porosity, coloring are possible by one process step through variable introduction. Only multi-component injection moulding machines can accomplish this today.

iii) For extruder systems, profiles can be extruded with different components at predetermined sections which can be foamed by diverting the plastic melt stream and introducing gas creators in one side stream by an injector so that this melt stream will expand and joined together with the material of the main stream.

iv) Plastics for sheet and tube extruders can be introduced with dyes, gas processors and softeners after the extruder. Therefore a fast change of the material properties is possible that leads to economical flexibility in the production process.

v) Pelletizing systems in the nutrition can be modified by introducing flavors and additives after the extruder by injectors, so that the material does not have to go through all the total length of the screw.

vi) Chemical and process-technological systems like distillation-water-treatment plants and oil refineries can utilize the invention. In this regard, the introduction and dosing and the homogenous distribution of bleaching agents, solvents in circuits of cellulose, pulp and mechanical wood pulp happens according to the state of art by dosing units with subsequent mixing. High shear forces are needed for the efficient mixing. Further, any modification of the operation parameters (because there is a change in the amount of additives or changing of color chemical additives) will have an effect only after completing a total running through of one plastisicing circuit.

The following application, processes and devices can be economically realized with the invention:

Introducing, dosing and homogenous distribution of additives as there are hardener, dyes, gas processors, softener, reactant into the melt stream of plastics in:
  Extrusion systems for sheets, tubes and profiles.
  Compounding systems for production and adaptation of plastics.
  Injection moulding, forming operation, preform manufacturing systems.
  Auxiliary processing, forming operation, preform manufacturing systems.
Introducing, dosing and homogenus distribution of catalyzers, reactants in flowing liquid in chemical, processing systems as well as, for instance, distillation water treatment, refinery systems.
Introducing, dosing and homogenous distribution of blowing agents, solvents into the circuit of pulp and ground wood systems.
Introducing, dosing and homogenous distribution into alloys and metallurgical additives as well as gas processors into the metal melt flow of die casting, profile casting and continuous casting systems.
Introducing dosing and homogenous distribution of additives and flavor agents for palletizing, dough and noodle processing systems in the nutrition industry.
Introducing, dosing and homogenous distribution of fuel into combustion systems.
Introducing, dosing and homogenous distribution of dyes and solvents in airless and spraying systems.
Introducing, dosing and homogenous distribution of additives into fluidized material like bulk and powder material, granules, pellets in plants operating fluidized bed and whirl sintering installations.

c) Method of Introducing Additives.

Exact dosing and homogenous distribution is utilized. The present invention relates to introducing additives for instance gas processors into the melt stream of plastics or low melting metals.

The advantage of this process is the application of light weight structures at locations of a part where it is demanded. The gas processing substance for expanding the matrix material is introduced in spatially predetermined positions.

Various operation modes and combination of these can be obtained firstly by pressure differences between melt and gas processing substances and secondly by the frequency of pulsation and thirdly by the shape of the nozzle reaching into the melt channel.

i) Creation of foam:

Creation of foam is possible using high frequency pulsation and therefore atomizing at high pressure differences and the advantages of counterflow and the subsequent high acceleration of the melt past variable sections of the melt channel. The difference in the speed of melt and additive is selected to be of a high value.

ii) Macro-hollow cavities:

The introduction happens by drop shaped dosing of the melt flow at low frequency of the pulsation and only small pressure difference in flow direction and essentially laminar streaming conditions of gas processors and melt.

iii) Continuous introduction:

Continuous introduction of a string of gas processors at nearly adequate flow speed of the passing medium. Small pressure difference is an advantage.

An apparatus for injection molding of compound parts with charger, which are connected to a pump which is compressing a chemical blowing agent has been published in DE1948454 by BAYER 1971 to achieve a spatially predetermined foaming. Because of the insufficient mixing and dosing the proposed foam quality cannot be reached. The present invention is demarcating from this apparatus by using injectors (combination of valve and nozzle) and pulsing injection and optionally using a continuously pressurized pipeline "common rail" and hydro-electrical activated valves. Because of the shaping of nozzles and channels according to hydrodynamic principles as well as regulated pressure, the apparatus is different. The solenoid is activated by electrical supply and optionally controlled to generate selected wave forms from an arbitrary wave generator. This leads to operation mode like atomizing, dosage and continuous string. The selection of pressure difference and frequency of pulsation leads to a predetermined introduction of gas processors into the melt. The exact dosing and pressure regulation leads to a targeted dosage of drops into the melt resulting in a subsequent macro hollow cavity expansion.

The apparatus for introduction of gas creating substances into the highly pressurized melt consists of a nozzle in immediate connection with a servo-valve, or consists of a pump-nozzle system with a non-return-valve combination.

The injection technology of combustion engineering has reached a high state of art concerning the exact repeatability due to the demands of strict exhaust specifications and is especially applicable to the invention. The state of the art is shown by "fuel-injection valves for internal combustion engines" disclosed in DE2028442, 1970, by DAIMLER BENZ. The hydraulic activation of the valve push rod is regulated by a three way valve. An "injection device" with hydroelectric activation was invented by PEUQUEOT, FR2145081, in 1971. The valve is pushed by a continuous hydraulic pressure and released by a controlled pressure loss on the backside of the push rod. In U.S. Pat. No. 3,990,422, 1973, by BENDIX CORP, the control of the hydroelectric activation has been improved by using a two circuit hydraulic system.

The present injectors show features which are necessary to comply with the demands of the inventive application and specification thereof. These are pressure regulation, elecrohydraulic activation by a push rod valve and pressure controlled by a sphere valve at the high pressure circuit, which is necessary to reach the high frequency pulsation and have the high pressure available at the nozzle needle immediately at the valve seat by a common rail system. This makes the accuracy independent of pressure and velocity differences between the gas creating substances and the melt.

The present invention relates to this high pressure technology which is to be adapted for the special condition of the introduction into the melt. The high pressure for injectors in combustion engines is needed for atomizing and distribution of the fuel in the combustion zone. The high pressure for injectors in melt introduction processes is needed to overcome the high melt pressure of about 100 to 140 MPa. Pressure of about 200 MPa can be reached by the available injectors with common rail. The continuous supply and the activation of the valves are solved with high reliability today.

An essential presupposition for running the injectors is the lubrication by the fuel because gas creating substances (water, alcohol, liquid gas) do not have substantial lubrication effect. The basic idea of the present invention is the use of two circuits applied to the standard injectors available in the market for making additional measures.

The patent JP 8170569 by NIPPON SOKEN, 1994, is showing a version of injectors for diesel engines by using a high pressurized circuit for injection and a low pressurized circuit for the servo hydraulic system. The inventive injector operates by separation of the hydro-electrical activation of the push rod of the valve which uses standard hydraulic oil and the introduction of gas creating substances happens at a slightly lower pressure (different than JP 8170569) because of a non return lock pressure that prevents penetration of the melt into the injector. Only the needle and seat of the valve are in touch with the non lubrication medium. These parts can be made of sintered highly wear resistant material and are easily changeable. The electro-hydraulic servo circuit is not effected because of the separate circuit.

Further alternative solution for the injector are:
1) Pump nozzle system with a combination of high pressure piston and spherical valves.
2) An electric activated swing system attached to a pump piston.
3) Limits for the stroke and positioning of the inlet valve as known for airless spraying systems can be used as well. In some applications, it is an advantage to have a small pressure difference between the introduced material and the melt. For this the above solution can be used.

The regulation and control of the introduction process has the following features. Optionally, the hydraulic circuit can be separated from the gas creating substances to be introduced. The pressure $p_1$ of the medium to be introduced and the pressure $p_2$ of the hydraulic system are regulated by a pressure limit valve. The controller regulating the pressure depends on the melt $p_3$, for the hydraulic system circuit as well as the injection pressure of the introduced medium. The injector is activated by a solenoid or piezo actuator. The regulation is controlled by an "Arbitrary Wave Form Generator", known to those skilled in the art. Furthermore, the specification of hydraulic, nozzles, injectors and melt channel are described below.

The hydraulics for continuous production for instance extrusion, continuous casting and for part production by injection moulding and die casting are prescribed. The system for continuous production is used for extruders. Continuous charging and multiple injector assembly is preferred. The system for part production is used in injection moulding and die casting systems. Because of the interruption after the injection a simple solution using a pressure multiplier double cylinder is offered for injection moulding systems. The hydraulic system of existing machines have usually a pressure of 26 MPa that can be used to produce high pressure by a pressure multiplying system. While plastification takes place, the pressure multiplier for the hydraulic system as well as for the introducing system is loaded with hydraulic oil and gas creating substance respectively. For the dosage of the melt with concrete size and spatially predetermined position it is necessary to achieve a constant pressure difference while injection takes place. A high pressure difference leads to the destroying of the melt. The ramping of the pressure is shown in FIG. 9. The injection pressure increases to the nominal pressure during the injection operation. During the injection the gas creating medium must be introduced by a higher pressure than the melt. The velocity of the melt in the gate of the mould has to be equivalent to the introduction speed of the gas creating medium. For achieving this feature an exact pressure regulation with electrical pressure limit and a precise activation of the hydroelectric valves is necessary. The shaping of the valve, valve seat and the smooth configuration of the melt channel according to hydrodynamic principles is important for repeatable dosage of the melt. The injectors of the "common rail technology" have the capability to fulfill these features.

The regulation of the solenoid takes place by controlling with "Arbitrary Wave Form Generator", opening and locking can be optimized by this system. Furthermore the shape of nozzle and melt channel is described.

d) Examples of Introducing Additives.

The present process relates to the modification of the properties (compounding) of an origin extruded material by divertion of the main stream into a side stream and introducing additives into this side stream by dosing, mixing and distribution of the original material. The kind of additives determine the properties of the plastic material of the melt. These additives are for instance additional components such as hardeners, dyes, gas processors, softeners, fillers and reinforcements.

This process can be applied to inside melt channels of mould for extrusion as well as for injection moulding systems, by means of using at least two diverted streams of melt to reach different properties of the plastic material. Profiles produced by this process have different properties of the material at spatially predetermined positions. This method saves an additional extruder to produce the additional material component. The essential advantage is, that based on the same origin material the waste disposal is not necessary, because based on the same material the recycling results in a unique material. The additives are introduced by nozzle, injector, charging tube, mixing head, porous sinter metal, sliding pump, charger and spraying system. The following concrete application for production of profiles are subsequently shown for instance:

i) PVC Window profiles.

Sections of the profile close to the outside or inside can be insulated with the present process by using foam filling at the concerned chambers. The calipers as used for the known multiple chamber systems will be adapted with inside channels and with the present described devices. From the main melt stream, diverted material comes to the channel duct within the caliber in which by means of a metering regulation (as there are valve, throttle) the melt is fed to the device for introduction of the additives. Subsequently devices for mixing and homogenizing are placed in the channel to complete the compounding process. Using PVC for the window profile the additive will be physical gas creators like water, carbon dioxide, alcohol, glycerin, etc. The pressure ramping in the melt duct is decreasing because the additives provide additional gas volume. For expansion of the material a conical zone is configured according to the volume increase or the velocity increase and the additional volume comes to an expansion zone (conical increasing outlet) so that the compounded material is fed to the outside solid PVC profile shells and can be homogenous and adhesively bound together. The advantage of the profiles with multi components comes by the cost effective production and the better properties of the material for heat and sound insulation (low pressure within the foam cells and therefore lower heat transfer rates) and less cost for recycling of the waste material. As a variation, the additives can be introduced by singular dosage leading to a profile with honeycomb shaped cellular structures of high strength. These structures replace the necessary stiffener profiles.

ii) Window profiles out of Polyolefins.

This is as described above but using Polypropylene PP or Polyethylene PE, HDPE, etc.

iii) Claddings or panel shaped coverings for outside or inside walls.

This is simpler than described above. The total extruded profile with foam core and large cell structure can be obtained by one diverted material stream from the main stream to be compounded within the center of the profile. The subsequent process of calibrating and cooling remains the same as before. The so obtained profiles can be used for inside cladding, mobile walls etc. having high stiffness by using large cell striker.

iv) Tubes from PVC, PO

Because of suitable introduction of gas creating and/or fillers, or reinforcement to the melt stream into spatially predetermined locations (as there are intermediate layer, outside layers, etc.), a multi component tube can be produced with simple measures. The device for compounding is attached in between the flanges of extruder and mould and is supplied by the channels of the mould to modify the properties of the material. Another production process with excellent mixing of the melt consists of introducing the additives before the cellular pump. Another improvement can be installed by attaching a mixer or dynamic mixing head for homogenous compounding.

v) Coloring of the outside layers of the profiles.

The introduction of dyes into the diverted melt channel makes it possible to produce a fast changeable coloring process. The process is most economical, because the expensive dyes are only applied on the outside and no loss of material happens by changing of color because the extruder does not have to be emptied completely. The change of the color comes into force immediately. Further possibilities for cost reduction can be achieved by bringing the coloring to the outside layers only.

vi) Production of sheets, insulation sheet material and compound sheets.

For systems having a large working width, the additives can be introduced into the center layer of the extruded sheet, or diverted to a melt channel similar to that described before for the device as implemented into the calipers having the total width of the sheet.

vii) Apparatus for adding up a extrusion system for multi component process.

The apparatus will be attached in between the flanges of the extruder and the mould. Following elements are included:

1) Inlet cones with diverting device for the melt channels;
2) Pressure and volume metering system;
3) Device for introduction of the additives optional consisting of nozzle, injector, charging pipe, mixing head, porous sinter metal, sliding pump, charger or spraying system (The mixer consist of static mixer, for instance with shafts, pins, diaphragms, helical zones.), and,
4) The expansion zone consists of variable sections, especially for foam components or macro cellular structures in the melt stream.

viii) Apparatus for dosage and mixing of additives into liquid medium by, using valve cone orifice or pocket hole orifice, especially hot runner valve.

The invention relates to a multifunctional mixing and dosing head, consisting of a nozzle cone and a nozzle needle, in which the volume flow is metered or blocking the outside flowing medium by the position of the outside nozzle needle and consisting of a nozzle cone and a nozzle needle, in which the volume flow is metered or blocking the inside flowing medium by the position of the inside nozzle needle.

This combination of valve, nozzle and injector leads to an economical mixing and dosing directly on the needle top of the concentric double cone. The invention also relates to a hot runner valve, having an injector, for introducing the additives into the outer flowing medium, instead of the valve needle. Several combinations of mixing and dosing heads are mentioned, especially the attachment to plasticizing unit, extruders, melt channel and the subsequent attachment of static mixer systems.

The economical benefit consists of the spatially predetermined location of the dosage and the excellent mixing and the exact dosing according to the mixing ratio. Applications for this hot runner valve with integrated mixing head includes introducing additives like dyes, hardener, softener, gas processors, etc. directly into the plastic melt and immediately before the gate of the mould. Besides the several known two component hot runner valves, the present suggested solution has the following features:

The application of the concentric positioned nozzle needles within the nozzle needle of this invention can be compared to EP 0310 914, 1987, "Process for Injection Moulding" (BATTENFELD), where a concentric positioned nozzle needle is shown in figure G.1 to 6.5. The present apparatus is demarcating from the above by using a spatially predetermined dosing of the melt while in EP 0310914 only each of the two media is switched to the mould. The present apparatus can achieve any mixing ratio in between by using the introduction of the additives by pulsation.

In U.S. Pat. No. 4,657,496, 1987, by HUSKY, a hot runner valve for 2 components is presented with concentric positioned charging tube. By the cavities (9) and (6) within the nozzle needle, depending on the position either the one or the other component is blocked or opened respectively. The concentric shaping of the inside located nozzle makes it possible to regulate the dosing by moving the outside nozzle needle which is controlled by the inner or outer nozzle. A mixing or a fast pulsing introduction as shown by the present apparatus is not a subject of the U.S. Pat. No. 4,657,496 Patents.

The target of the present invention is not only to introduce at least two media in a concentric manner, but also to achieve a mixing, i.e., to dosage the outer medium with the inner medium.

In U.S. Pat. No. 5,286,184, a variation of the concentric nozzle is published, which differs from U.S. Pat. No. 4,657,496, in that it discloses the activation of the hollow shaped nozzle needle. Also in this case, there is a concentric introduction, but no mixing or dosage is the target.

The nozzle needle is activated by a push rod within the boring of the nozzle needle and is regulated by a servo-mechanic. To reach a spatially predetermined position by the dosage and/or dosing and excellent mixing the usage of a valve cone orifice VCO and a CDI injectors, as it is used in combustion engines, is an advantage. The activation of the injector is known by a hydraulic piston but also can use for the servo-mechanics for instance, solenoid, piezo actuator, hydraulic servo, etc.

BRIEF DESCRIPTION OF THE DRAWINGS

The invention may take form in certain parts and arrangement of parts, preferred embodiments of which will be described in detail and illustrated in the accompanying drawings which form a part hereof and wherein:

FIG. 1 is a schematic sectioned view of a valve cone orifice nozzle tip;

FIG. 2 is a sectioned view similar to FIG. 1 illustrating a pocket hole orifice;

FIG. 3 is an elevation schematic view of a dosing and mixing arrangement;

FIG. 4 is a top view of the schematic arrangement illustrated in FIG. 3;

FIG. 5 is a schematic, cross-sectioned view of a tube shown in FIG. 3;

FIG. 6 is a schematically sectioned plan view of an extruder mold reducing the cylindrical profile;

FIG. 7 is an enlarged, schematically sectioned view of one of the nozzles illustrated in FIG. 6;

FIG. 8 is a schematic, sectioned plan view of an injector fitted to a tube;

FIG. 9 is an enlarged view of the injection nozzle/tube arrangement illustrated in FIG. 8 showing cascade distribution of the injection;

FIGS. 10 and 11 are schematically sectioned elevation views showing the invention applied with a plasticating screw;

FIG. 12 is a schematic elevation view showing the invention applied after the mold gate of a plasticating screw arrangement;

FIGS. 13 and 14 are schematic representations indicating the nozzle flow pattern;

FIG. 15 is a schematic representation of a dosing and mixing arrangement for a combustion system;

FIG. 16a is a schematic representation of a mold for an extruder;

FIG. 16b is an orthogonal representation of the mold depicted in FIG. 16a;

FIGS. 17a and 17b are views similar to FIGS. 16a and 16b respectively;

FIG. 18 is a schematic operating diagram for standard injectors used in the present invention;

FIG. 19 is a schematic, cross-sectional elevation view of a standard, conventional injector shown with a pocket hole valve;

FIG. 20 is a schematic elevation view of a prior art injector;

FIGS. 21 and 22 are views similar to FIG. 20 showing modifications to the injector;

FIG. 23 is a schematic elevation view showing a pump nozzle configuration;

FIG. 24 is a view similar to FIG. 23 illustrating an airless spraying system;

FIG. 25 is a hydraulic circuit representation for the application of the invention's injection molding and die casting system;

FIG. 26 is a graph showing melt pressure traces as a function of time;

FIGS. 27, 28 and 29 are schematic representations of various melt channels used with the invention;

FIG. 30 is a depiction of several different nozzles designated "a", "b", "c", capable of being used with the invention;

FIGS. 31, 32 and 33 are also depictions of nozzle configurations with orifice views designated by "b";

FIG. 34 is a schematic elevation view depicting the device compounding a melt stream;

FIG. 35 is a schematic representation of a plan view of the arrangement shown in FIG. 34;

FIGS. 36a and 36b are cross-sectioned views of the outlet and inlet, respectively, of the arrangement shown in FIGS. 34 and 35 illustrating the condition of the melt therein;

FIGS. 37a and 37b are schematic view of the outlet and inlet, respectively, of the nozzle disclosed in FIG. 33;

FIG. 38 is a schematic elevation view of a melt chamber;

FIG. 39 is a schematic elevation view of a melt chamber similar to FIG. 38;

FIGS. 40a, 40b, 40c and 40d illustrate various profile shapes capable of being produced by the subject invention;

FIG. 41 is a schematic elevation view of the melt channel similar to that shown, for example, in FIGS. 38 and 39;

FIG. 42 is an enlarged view of the injector used in the melt channel shown in FIG. 41;

FIG. 43 is an elevation view of a hot runner valve;

FIG. 44 is a view of the orifice of the hot runner valve shown in FIG. 43 in greater detail with the nozzle/orifice arrangement of the present invention depicted on the right side of the drawing and prior art injector nozzle arrangement shown on the left side of the drawing;

FIGS. 45a, 45b and 45c schematically depict, respectively, progressively closing positions of the needle valve used in the subject invention;

FIGS. 46a, 46b and 46c represent enlarged views of the orifice/needle shown in FIGS. 45a, 45b and 45c, respectively;

FIGS. 47 and 48 are schematic elevation representations of an injector in the hot runner valve; and, FIGS. 49 and 50 are elevation schematic cross-sectioned views of the injector applied to specific melt channels.

DETAILED DESCRIPTION OF THE INVENTION

Referring now to the drawings wherein the showings are for the purpose of illustrating preferred embodiments of the invention and not for the purpose of limiting the same, there is shown in FIGS. 1 and 2 nozzles, nozzle needles and nozzle seats. The subsequent FIGS. 3 through 17 show samples for the application of the present method of introduction with exact dosing and homogenous distribution. In FIGS. 1 and 2 nozzles and nozzle needles and needle seats are shown. The subsequent FIGS. 3 to 17 show samples for the application of the present method of introduction with exact dosing and homogenous distribution.

FIG. 1 shows a valve cone orifice, "VCO" nozzle tip. With (1) the nozzle needle closing the needle seat (3) is located in the nozzle body (2). The small volume of the front chamber (5) is the target of the VCO. The orifices (4) are inclined about 80° to the axis as used in combustion engines. Other orifices (6) shown on the right side of the axis having a stepwise inclinations of 0° to 75° inclined to the axis.

In FIG. 2, a pocket hole orifice is shown. The larger front chamber (8) of the nozzle gives a larger volume of free drops, by means an inexact dosing. The larger chamber gives the possibility of several radial arranged orifices (6) as well as an axial positioned orifice (7).

In FIG. 3, an arrangement of a dosing and mixing arrangement for a flowing medium in a tube (10) is drawn with five injectors (11) reaching into the tube. The injectors are connected to a high pressure pipeline (12) containing the additive. The tank (14), the high pressure pump (9) and the common rail (15) and the leakage pipe (13) are shown.

In FIG. 4, an arrangement of FIG. 3 is shown from the top view for a extrusion system. The dosing and mixing unit is positioned in flow direction between the cellular pump (16) the mixing tube (10) and mixer (10) and the mould (22).

FIG. 5 shows a sectional view of the tube (10) which is enlarged. The five nozzle tips (2) are in a radial 72° pattern arranged. Each nozzle tip has 7 orifices positioned in an angle of 75°, 50°, 25° and 0°, etc. The jet of the injection (18) gives a complete covering of the section of the medium (17). The length of the jet stream is determined by the diameter of the orifice and is usual between 0.11 mm and 0.14 mm.

FIG. 6 shows a mould for an extruder producing a cylindrical profile. Two of the several arranged injectors (11) are shown in the section. The additives (18) are introduced according to the velocity of the medium (17) in the flow direction.

In FIG. 7 the detail of the nozzle arrangement is drawn. The nozzle bodies (2) have at least one orifice (4) in the direction of the melt channel. The jet stream is directed to bring the additives, not wall sides (10), into the core (38) of the stream.

In FIG. 8 an application for a single injector is arranged which is indined about 45° to the tube axis (10). The orifice (4) is inclined in a flat slope angle to the medium flow i.e. the orifice is positioned about 40° out of the axis of the injector. The pulsing introduction is giving a cascade distribution shown in FIG. 9.

FIG. 10 gives applications for injection moulding systems. Similar to FIGS. 8 and 9, two injectors (11) are introducing the with a light slope in direction of the axis of the nozzle tip (21) of the plastisicing unit. The location of the injector is after the screw tip (40) but within the front chamber (20) of the barrel (19). Further excellent mixing, for example of dyes can be had. This arrangement also can be placed within screw sectors within the plastisicing arrangement.

For accurate dosing with less mixing the arrangement of FIG. 11 takes place. The introduction happens in the center hole of the plastisicing nozzle tip (21). This is used for application with hardener and softener (minimum leakage).

In FIG. 12 the introduction happens by the injector (11) immediately after the mould gate at the inlet of the mould (22). The advantage of a hot runner system (23) is evident. The Mixture of medium and additives is not depending on the plastisicing unit (19) but determined by the introduction of additives, i.e., flexible and variable.

FIG. 13 shows an airless jet stream (25). The flowing medium (39) is the streaming side air. The additive is dyes (18). The pulsation determines the coloring conditions.

The nozzle arrangement is shown in FIG. 14. At least one orifice (4) in the nozzle body (2) is directed near the axis and determines the spraying structure (18).

In FIG. 15 the dosing and mixing arrangement is shown for a combustion system. The nozzle body (2) is reaching into the combustion chamber (27) and is limited by the casing (28) of the burner zone. The combustion air is compressed by a blower (26) and the atomizing of the fuel uses the standard arrangement of orifices located on a cone. The injection jet stream (18) results in accurate dosing and mixing of the perfect combustion. (29).

In FIGS. 16a and 16b the application of a mould for an extruder production of profiles—for instance window profiles—is arranged. The dosing and mixing have the purpose of modifying material diverted from the main stream of the melt for example with gas processors. The section shape is shown in FIG. 16b. The injector (11) reaches into the side channel (30). The different material streams (31) are separated by inlet channels, calipers (32). The melt stream (17) is introduced (18) by additives and is creating foam in the side stream which is transported to the chambers (33) and (34). Chambers with solid calipers creating hollow profile space is usual.

In FIGS. 17a and b the introduction of additives (18) by pulsation into the side channel is shown. The arrangement is also for extrusion systems as in FIG. 16 as well as for pelletizing and continuous casting with mixing zone (10) applicable. FIG. 17a shows the tube section (30) and the single tube (10). FIG. 17b shows the lateral section of the tube (30/10). The nozzle body (2) is having 7 radial arranged orifices (4) and giving full coverage of the material section (17) by the jet streams (18) for dosing and mixing. A sequence of several jet streams (36) respectively (37) introduced in flow direction are shown in 17b.

In FIG. 18 the total apparatus for injectors of standard design is given in the layout. The utilization of pumps (101) and (105) enable the application to be used in a continuous operation (extrusion). The circuit for the additives (103) is separated from the circuit of the hydraulic oil of the servo (104). The pressure of the circuits is regulated by an electrically activated presser limit valve (102, 106). The valve (112) is released by electro-hydraulic mechanics. The mechanics consists of a solenoid (109) a spherical valve (108) and the push rod connected to the high pressure piston (110). The controller (122) is regulating the electro-hydraulic mechanics according to the information (120) given by the operation data as there is injection time/extrusion data (123) according to the pressure sensor in the melt (115) of the pressure of the additive circuit (102) and the pressure of the hydraulic oil of the servo (106).

The arbitrary wave form generator (120) creates the opening current for the electro mechanism (112). The introduction of the gas processors (117) into the melt stream (114) happens in the interface (116) part after the extruder tip (160) by a nozzle (113) reaching into the channel. For heating, a heater band (159) is located around the nozzle (113).

FIG. 19 shows a standard injector. This version shows a pocket hole valve (113) with a small front chamber. The valve seat (112) is locking the nozzle from the continuous pressurized circuit.

The push spring (131) increases the force resulting from the difference of force on the nozzle needle (112) and the hydraulic pressing (110). The opening is activated by the solenoid (109) which releases the sphere of the valve (108) and hydraulic oil of the servo is streaming out of the high pressure chamber (110).

FIG. 20 shows an injector of the state of art. The essential features can be readily recognized. The version with the electro-hydraulic activation is extended by throttle (129) and anchor(127) and double chamber. Standard injectors having separate inlets (126) for the servo supply and the injection supply.

FIG. 21 shows a section of a modification of a standard "common rail injector". The already available two supply borings are attached to a special fitting.

FIG. 22 shows the modification of a standard "common rail injector" with a second boring. The supply (132) of the hydraulic servo circuit is blocked by a pin. Additional supply is given by a boring (133) and a second fitting (126) for the servo circuit.

FIG. 23 shows a pump-nozzle configuration in principle, by means of the high pressure chamber being close to the location of the nozzle. The medium of the additive is supplied through a boring in the push rod (135) and the pressurizing is effected by an inlet valve (137) and an outlet-valve (139). The penetration of the melt into the injector is prevented by a sphere (137) which is pressed by a non-return-spring (138) into the valve seat. The push rod (135) is activated by a magnetic swing system (127). By stroke limit (134) the size of the pulsation is determined. The line for leakage (140) returns the overflowing medium.

FIG. 24 shows the principle of an airless spraying state of the art system, applied to the present application by using a valve sphere (139) within the nozzle. The advantage of a small front chamber can be reached by a overlapping (141) of the sphere valve (134, 135, 140) as shown in FIG. 23.

FIG. 25 shows a hydraulic system for part production for instance for injection moulding and die casting systems. The operation of the injector is having a twin circuit system. The pressure multiplier is connected to the basic hydraulic system of the machine (142). While processing the part there is time to load the system for injection. The pressure multiplier cylinder for the additive (143) and for the servo hydraulic oil (144) are pressurized and being regulated by the pressure limit valve (142) during the melt injection having the pressure $p_4$. Subsequently the chambers of the cylinders are refilled by pumps (101) for the additive and pumps (105) for the hydraulic oil.

FIG. 26 showing the features of the pressure ramping y-axis in MPa (145) over the duration for the present processing. The melt pressure $p_3$ is shown by the curve (148). The pressure of the additive $p_1$ is shown by curve (146), the pressure of the servo hydraulic $p_2$ shown with the line (147). The electric potential (153) to activate the electro-hydraulic regulation is shown by the curve (149). Various wave forms can be produced and are shown by way of example as triangle (154), half sinus waves (155) at different frequencies and full sinus wave form (156) with different frequencies and phases or full sinus form (157) in different frequency or different phases (158) as well as unsymmetrical wave forms, all being produced by an arbitrary wave form generator.

FIGS. 27, 28 and 29 show several melt channels. FIG. 27 shows a parallel melt channel (114) in flow direction positioned orifice having an interface part (116) between mould (162) and nozzle tip (160) of the barrel. This arrangement is applicable for dosage with drops (161) into the melt stream (114). FIG. 28 shows a radial multiple orifice (163) in flow and counterflow position for excellent mixing of the additives with the melt in an enlarged melt channel (114) which causes additional mixing by change of velocity. FIG. 29 shows a continuous string introduction (164) into the melt channel. These method is able to process axial hollow cavities for extruded profiles.

FIGS. 30,31 and 32 show a nozzle with various orifices. FIG. 30 shows state of the art. FIG. 30a shows a VCO valve cone orifice. FIG. 30b shows radial multiple orifices. FIG. 30c shows pocket hole orifices. FIG. 31 shows a nozzle for flow and counterflow introduction. For introduction of additives as drops into the melt the nozzle is designed according to hydrodynamic principles. For preventing atomizing, sharp edges have to be avoided. The channel profile has smooth profiles in valve cone (170) and at the nozzle profiles (171). FIG. 32 shows a nozzle introducing drops sidewise in flow direction. FIG. 33 shows a nozzle for atomizing in the conical seat (172) and plane seat (173) rectangular to the flow direction.

FIG. 34 shows a detail of the device for compounding a melt stream. This version is implemented in calipers (53) of profile moulds (51) or for array assembly for moulds to produce sheets. The section is showing details of FIGS. 16a and 16b. The view shows the material flow from right to left. The caliber (53) at the inlet side is conical (64) shaped. The inlet is having a pressure sensor (63) connected to the controller (62) and supplying data to it. The introduction is flow direction (55b) and counterflow (55a). The advantage of the counterflow is the introduction of individually closed dosages. The introduction may optionally be caused by pulsation. For instance chicanes for the melt. The change of velocity leads to shear forces and to additional mixing respectively in the expansion zone (60).

FIG. 35 shows the top view of FIG. 34 and the relevant numbers are the same. Note the narrow section in the melt channel.

In FIGS. 36a and 36b the section of the inlet and outlet is shown related to the device in FIGS. 34 and 35 FIG. 36b shows the inlet in a sectional view.

FIGS. 37a and 37b show the version of the invention as it is in FIGS. 33a and 33b but for simple foamed profiles as there are claddings with integrated insulation, panels and tubes. Reference numbers are the same as in FIG. 33.

FIG. 38 shows a version of melt channel before the distribution chamber of the mould. Two inlet cones (64), (65) and the center inlets (66) provide a twin chamber to the melt.

FIG. 39 shows a version of melt channel design with central inlet of the side channel and a concentrically (twin) introduction of additives and subsequent merging of the melt at spatially predetermined locations of the profile. The melt channel is crossing the main channel (67) in the center of the surrounded flow.

FIG. 40a shows a rectangular profile. FIG. 40b shows a circle, tube profile. FIG. 40c shows an elliptical profile and FIG. 40d shows a rounded rectangular profile. Several profile shapes with multiple components are shown for instance in FIGS. 33, 38, 39 and 41 as being produced as simple tubular profiles.

FIG. 41 sketches a device with an add up for existing extrusion systems and can be modified for multi-component operation. For reference, (68) is the flange of the melt channel (69) and is the flange of the extruder, while (70) is the interface part for adding up and (71) is the melt channel with through put.

FIG. 42 shows the device in FIG. 41 in detail. The device is made out of a disc (70) and attached between flanges (68) and (69). The disc has injectors for introduction of the additives as well as diaphragms (72) to divert the melt channel. The tube (72) with attached planes for the hollow calipers is shown in principle.

In FIGS. 43 to 46, hot runner valves for injection moulding systems are shown.

In FIG. 44, a device in accordance with the invention is compared to a the state of art device.

FIGS. 45A to 45C show the progressive activation of the needle tip and FIGS. 46A to 46C correspond to FIGS. 45A to 45C, respectively, and show the needle tip in detail.

FIG. 47 shows the version of the invention with high frequency pulsing (CDI Injector).

FIG. 48 shows the integration of CDI Injectors in the hot runner valve.

FIG. 49 shows the arrangement of a mixing and dosing head for example in the melt channel of the plasticizing unit of an injection moulding machine or an extruder.

FIG. 50 shows an arrangement of a twin unit in counter-flow used for liquid/liquid mixing as well as for extruders with a subsequent static mixer.

FIG. 43 shows a device for mixing and dosing and dosage. The inner nozzle needle (82) is activated by the adjusting device (93) and is in the shape of the seat (83) for a pocket hole orifice or a valve cone orifice. This insert also is part of the outer nozzle needle and shaped to be attached to the actuator piston (90) The supply of the additive happens by the boring (85) and is again attached to the interface (91). The viscous medium is supplied by the channel (89) and passes between the outer nozzle (81) and the supply tube (94,) for instance a hot runner valve a plasticizing unit or a melt channel of an extruder to the final destination.

In FIG. 44 the nozzle beneath "Prior Art" shows the version of a conventional inner nozzle needle as a push rod (84), as well as the inner nozzle seat, as well as the outer nozzle (94), or both according to the position of the push rod (84) for opening or locking. The outer nozzle needle is moved and regulated according to the supply of the outer medium. In FIG. 44 the present device is shown and has a nozzle insert (83) as shown in the figure as a valve cone (VCO). The orifices of the inner nozzle (83) are completely covered when inside needle (82) is locked. The inner substance is supplied between the nozzle needle (82) and the valve cone orifice (83) and is introduced in the inlet to the outer medium (89). According to the position of the inner nozzle (82) and the pulsation, the atomizing of the introduced substance (85) into the outer medium (89) occurs. The conical shaped outer nozzle needle (83), being at the same function for the inner nozzle needle is locking the orifices of the nozzle seat of the hot runner (94) of the plasticizing unit (95) or of the melt channel of an (97), and regulates the opening according to the demanded volume flow and the introduction of the two media (92).

In FIG. 45A the open position for introducing the outer medium is shown. The outer nozzle needle (81) is open. The inner nozzle (82) is closed. The substance (85) cannot penetrate. In FIG. 45B the inner nozzle needle (82) is open and gives space for the valve cone orifices (83) and the inner substance (85) is introducing to the outer medium (92). In FIG. 45C the inner nozzle needle (82), as well as the outer nozzle needle (83) is closed.

FIGS. 46A, 46B, 46C are corresponding to FIGS. 45A, 45B, 45C but show enlarged details.

FIG. 47 shows the combination of a CDI injector (8B) in a nozzle seat as cone valve/pocket hole nozzle (87), having the function of the nozzle needle in the needle seat of the melt channel and closing the valve seal of the hot runner valve (94). The CDI injector is activated by the position device (93). The inner nozzle needle is activated by a solenoid/hydraulic or a piezo/hydraulic servo. The supply of the substance happens through the fitting (91). The melt is supplied by the channel (89).

FIG. 48 is showing details of FIG. 46 and differs by the melt channel (89) attached as a separate insert (87).

FIG. 49 shows the arrangement of a mixing and dosing head (95) inside the nozzle tip of the plasticizing unit (96) of an injection moulding system. The insert (87) reaches into the mixing head (95) and the outer nozzle (81) and at the same time as the insert (87) regulates the flow of the melt (89).

FIG. 50 shows the dosing and mixing head (98) in a tube, for instance in a tube as liquid/liquid mixer of a melt channel of an extrusion system (99). The inserts (87a, 87b) reach into the conical nozzle seat of the mixer and modify the outer nozzle needle (81) according to the position of the volume flow of the melt (89). The supply happens by a charging device (97) directing the melt into the conical valve seat. The additional mixing occurs by arranging the mixing heads in a counter flow to have counter impact on the media flow. Optionally, this arrangement can have four media which can be mixed together. Optionally, a static mixer can be attached subsequent to the mixing and dosing device.

Indexing of Reference Numbers:

| | |
|---|---|
| 1. | Nozzle needle precisely moved |
| 2. | Nozzle body |
| 3. | Nozzle needle seat |
| 4. | Plane plurality of orifice arrangement |
| 5. | Cavity at valve cone orifice VCO |
| 6. | Radial plurality of orifice arrangement |
| 7. | Axial boring in nozzle body |
| 8. | Cavity at valve sack orifice |
| 9. | High pressure pump |
| 10.1 | Channel of streaming medium |
| 11. | Injector |
| 12. | High pressure piping |
| 13. | Leakage backflow piping |
| 14. | Container of additives |
| 15. | Common rail (communication system) |
| 16. | Cellular pump |
| 17. | Streaming medium |
| 18. | Injection spray stream |
| 19. | Plasticizing barrel |
| 20. | Dosing chamber of barrel of injection moulding machines |
| 21. | Nozzle of plasticizing barrel |
| 22. | Mould |
| 23. | Hot runner system |
| 24. | Non-return-valve |
| 25. | Airless spraying system |
| 26. | Compressor |
| 27. | Combustion air piping |
| 28. | Combustion chamber |
| 29. | Combustion zone |
| 30. | Inner rod (caliber) of extrusion mould |
| 31. | Section of extruded profile |
| 32. | Inner rod (caliber) for hollow section |
| 33. | Foamed inner section |
| 34. | Hollow section |
| 35. | Extruded profile |
| 36. | Cascade shaped injection |
| 37. | Radial plurality of orifice arrangement for extrusion |
| 38. | Core of the mould |
| 39. | Jet streaming combustion air |
| 40. | Screw of plasticizing unit |
| 41. | Expansion zone in the extrusion mould, preferable situated in the inner rod of the mould |

| | | |
|---|---|---|
| 51. | Mould for production of profiles by extrusion | |
| 52. | Melt stream, feeding of melt from extruder to the mould | |
| 53. | Caliber inside the melt stream section, implementation for the mould to conduct the melt stream, particular with an integrated melt channel. | |
| 54. | Injector, nozzle for introducing of additives into the separately arranged melt channel. | |
| 55. | Introduction of additives | |
| 55a. | Introduction in flow direction | |
| 55b. | Introduction in counter flow | |
| 56. | Outlet section of separately arranged melt channel. | |
| 57. | Caliber inner rod for forming a hollow section and hollow profile. | |
| 58. | Melt channel with original shaped extruded profile and the corresponding section. | |
| 59. | High pressure pump for additives. | |
| 60. | Zone of expansion for the introduced gas creating additives. | |
| 61. | Adjustable section for controlled outflow, chicane for mixing | |
| 621. | Adjustable section for controlled inflow. | |
| 63. | Pressure sensing cell for the separately arranged melt stream as indicator. | |
| 64. | Caliber inner rod with melt channel and inlet opening. | |
| 65. | Tubular inlet section for multiple shell arrangement for extrusion profiles. | |
| 66. | Central inlet opening for the inner shell of the extrusion profile. | |
| 67. | Intersecting melt duct, passing through main melt stream. | |
| 68. | Flange of the mould | |
| 69. | Flange of the extruder | |
| 70. | Intermediate add up equipment | |
| 71. | Extension of the melt stream channel | |
| 72. | Intersection through the melt stream channel | |
| 81. | Melt medium nozzle needle outside | |
| 82. | Additive nozzle needle inside | |
| 83. | Coaxial conical needle seat | |
| 84. | Bolt in boring to activate the additive nozzle needle | |
| 85. | Supply of additives to the boring | |
| 86. | Details of mixing and dosing device | |
| 87. | Valve cone orifice, Pocket hole orifice | |
| 88. | Common rail injector (CDI injector) | |
| 89. | Supply channel for melt stream | |
| 90. | Activator piston by hydraulics | |
| 91. | Supply of the additives | |
| 92. | Introduction of additives to the melt | |
| 93. | Servo-mechanics for instance electro/hydraulic, piezo/hydraulic | |
| 94. | Hotrunner Nozzle seat | |
| 95. | Injection Molding nozzle seat | |
| 96. | Injection Molding plastisicing nozzle | |
| 97. | Extrusion nozzle seat | |
| 98. | Supply device | |
| 99. | Melt channel for extruders | |
| 100. | Statical mixer | |
| 101. | Feeding device for gas creators | |
| 102. | Pressure controller for gas C. p1 | |
| 103. | Circuit for gas creator substance | |
| 104. | Hydraulic circuit for activation | |
| 105. | Feeding device for hydraulic circuit | |
| 106. | Pressure control for hydraulic c. p2 | |
| 107. | Tank for hydraulic oil | |
| 108. | Spheres for valve | |
| 109. | Solenoid or piezo activator device | |
| 110. | Hydraulic activation of the valve | |
| 111. | Back pressure, seal | |
| 112. | Valve for the injector | |
| 113. | Nozzle of injector | |
| 114. | Gate of the melt stream | |
| 115. | Pressure sensor-cell in melt stream | |
| 116. | Adapting device between the runner | |
| 117. | Introduction of additives to the melt | |
| 118. | Heaterband of the adapting device | |
| 119. | Pressure control for additives p3 | |
| 120. | Arbitrary Wave Form Generator | |
| 121. | Pressure controller for additives | |
| 122. | Controller | |
| 123. | Interface to injection moulding machine, extruder, die-casting | |
| 124. | Pump-nozzle combination | |
| 125. | Leakage piping | |
| 126. | Supply piping for hydraulic | |
| 127. | Anchor for solenoid activation | |
| 128. | Injector | |
| 129. | Throttle valve | |
| 130. | Valve push rod | |
| 131. | Spring for clamping | |
| 132. | Feeder piping for gas creator | |
| 133. | Additional channel for $2^{nd}$ medium | |
| 134. | Stopping device f. stroke limitation | |
| 135. | Pump push rod | |
| 136. | Feeding pipeline valve | |
| 137. | Feeding pipeline for sphere valve | |
| 138. | Reverse motion spring 18 | |
| 139. | Backpressure valve on melt end | |
| 140. | Leakage pipeline | |
| 141. | Shrinkage of sphere seat | |
| 142. | Hydraulic system of basic machine | |
| 143. | Pressure multiplier piston additive | |
| 144. | Pressure multiplier piston hydraulics | |
| 145. | Axis for force in MPa | |
| 146. | P1 pressure of additive | |
| 147. | P2 pressure of hydraulic | |
| 148. | P3 pressure of melt | |
| 149. | P5 pressure on control piston | |
| 150. | Axis of time | |
| 151. | Current supply to solenoid | |
| 152. | Center line | |
| 153. | Trapezoid wave shape | |

-continued

| | |
|---|---|
| 154. | Triangle wave shape |
| 155. | Half sinus wave |
| 156. | Full sinus wave |
| 157. | Periodic wave form |
| 158. | Unsymmetrical full sinus wave |
| 159. | Heaterband for injector |
| 160. | Injector |
| 161. | Introduction in flow direction |
| 162. | Adaptation to the mould |
| 163. | Spraying in melt flow/counter melt flow |
| 164. | Volume enlargement after continuous introducing of additives |
| 165. | Nozzle body |
| 166. | Slot shaped nozzle |
| 167. | Radial shaped nozzle borings |
| 168. | Valve cone orifice |
| 169. | Enlarged Laval channel |
| 170. | Nozzle needle open |
| 171. | Channel of nozzle |
| 171. | Valve cone orifice nozzle channel |
| 172. | Conical nozzle needle, axial spray |

What is claimed is:

1. A system for introducing an additive into a viscous medium comprising:

a conduit having an inlet and an outlet;

means for introducing a viscous medium into said conduit inlet;

an injector having a nozzle with an axially extending bore therein, said nozzle having a nozzle passage with a nozzle outlet in fluid communication with said conduit and an inlet in fluid communication with said bore, a needle extending axially within said bore and having valve means associated therewith for controlling fluid communication of said bore with said inlet of said nozzle passage as a function of the axial position of said needle in said bore;

a pressure regulator for controlling the pressure of an additive in said bore and the viscous medium in said conduit;

actuating means for axially moving said needle in said bore in response to an electrical signal in a cyclical manner from a first position whereat said nozzle passage inlet is closed to a second position whereat said nozzle passage inlet is in fluid communication with said bore to a set degree, said movement from said first position to said second position occurring at a set frequency and at a set time for said second position whereby said additive is pulsed into said medium.

2. The system of claim 1 further including mixing means in said conduit downstream of said nozzle for causing the direction of said medium with said additive to change promoting mixing of said medium with said additive.

3. The system of claim 2 wherein said mixing means include a static mixer in said conduit.

4. The system of claim 2 wherein said mixing means includes a plurality of longitudinally spaced obstructions within said conduit downstream of said nozzle.

5. The system of claim 2 wherein said mixing means includes a longitudinally extending channel within said conduit having a channel inlet and a channel outlet, said channel having a longitudinally-extending portion thereof of increasing cross-sectional area in the direction of said channel outlet and said nozzle adjacent said channel inlet.

6. The system of claim 2 wherein the diameter of said nozzle passages is between 0.08 and 0.2 mm and said pressure regulator is set to establish a higher additive pressure in said bore than said melt in said conduit whereby said nozzle passages act as orifices.

7. The system of claim 6 wherein said nozzle bore has a nozzle seat formed therein upstream of said nozzle passage inlet and said needle has a valving surface adjacent said nozzle seat for opening and closing said nozzle seat as a function of axial position of said needle in said bore.

8. The system of claim 7 wherein said valve seat has sharp edge surfaces whereby atomized spray exits from said nozzle passage outlet into said medium.

9. The system of claim 7 wherein said nozzle has a plurality of nozzle passages circumferentially spaced about said nozzle at set inclined angles relative to the longitudinal direction of said nozzle.

10. The system of claim 8 wherein said nozzle has a pocket at an end thereof and through which said nozzle passage extends, said valve seat being disposed upstream of said pocket whereby discrete drops of additives may be injected into said medium upon opening and closing of said nozzle with said valve seat.

11. The system of claim 6 further including said needle having a needle bore axially extending therein; said needle having orifice passages adjacent the tip of said needle in fluid communication with said bore in said nozzle and a needle valve is said needle bore movable within said bore to open and close said orifice passages; and said actuator means controlling said needle valve and the position of said needle independently of one another.

12. The system of claim 11 wherein said needle valve is an interior needle within said needle bore and said actuator means effective to move said interior needle within said needle bore to open and close said orifice passages and said regulator effective to supply pressurized additive to said needle bore and pressurized medium to said bore between said nozzle and said needle.

13. The system of claim 2 further including an extruder plasticating screw within an extruder barrel for forming said medium as a plastic melt, said regulator controlling the rotation of said extruder screw and the temperature of said barrel to control the pressure of said melt, said extruder barrel having a space forward of said screw for receiving said melt terminating at an extruder nozzle, a die mold adjacent said extruder nozzle and melt channels between said nozzle and said mold or within said mold, said additive selected as at least one element from the group consisting of gas producing substances, dyes, hardeners, softeners, fillers, blends and reactants and said conduit comprising at least one element selected from the group consisting of said forward space, said melt channels and said die mold.

14. The system of claim 2 further including a reciprocal in-line injection molding plasticating screw within an injection barrel for forming said medium as a plastic melt, said regulator controlling the rotation and translation of said screw and the temperature of said barrel to control the pressure of said melt, said barrel having a space forward of said screw for receiving said melt terminating at an injection barrel nozzle, a mold adjacent said injection nozzle, at least one hot runner between said mold and said injection nozzle and melt channels within said mold, said additive selected as at least one element from the group consisting of gas producing substances, dyes, hardeners, softeners, fillers, blends and reactants and said conduit comprising at least one element selected from the group consisting of said forward barrel space, said melt channels and said hot runner.

15. The system of claim 2 further including a casting machine for producing said medium as a molten metal, said metal flowing in a valved passage to a die mold, said die mold having melt channels within said mold, said additive selected as at least one element from the group consisting of alloys and metallurgical additives, and said conduit comprising at least one element selected from the group consisting of said valved passage and said melt channels.

* * * * *